(12) United States Patent
Sundholm

(10) Patent No.: US 10,399,799 B2
(45) Date of Patent: Sep. 3, 2019

(54) METHOD AND APPARATUS FOR FEEDING IN AND HANDLING WASTE MATERIAL

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 16 days.

(21) Appl. No.: 14/904,483

(22) PCT Filed: Jul. 29, 2014

(86) PCT No.: PCT/FI2014/050597
§ 371 (c)(1),
(2) Date: Jan. 12, 2016

(87) PCT Pub. No.: WO2015/015054
PCT Pub. Date: Feb. 5, 2015

(65) Prior Publication Data
US 2016/0167898 A1    Jun. 16, 2016

(30) Foreign Application Priority Data

Jul. 30, 2013 (FI) .................................. 20135801
Nov. 18, 2013 (FI) .................................. 20136141

(51) Int. Cl.
*B65G 53/28* (2006.01)
*B65G 53/46* (2006.01)
(Continued)

(52) U.S. Cl.
CPC ............... *B65G 53/46* (2013.01); *B65F 1/10* (2013.01); *B65F 5/005* (2013.01); *B65G 53/4691* (2013.01)

(58) Field of Classification Search
CPC ......... B65G 53/28; B65G 53/46; B65F 5/005; B65F 2210/12; E04F 17/10; E04F 17/12
(Continued)

(56) References Cited

U.S. PATENT DOCUMENTS 3,583,770 A * 6/1971 Medhammar ........... B65F 5/005
100/215
3,653,720 A * 4/1972 Craig ....................... B65F 5/005
406/130
(Continued)

FOREIGN PATENT DOCUMENTS

CN    1339007 A    3/2002
CN    1358154 A    7/2002
(Continued)

OTHER PUBLICATIONS

European Patent Office, "Search Opinion with Extended Search Report," issued in connection with European Patent Application No. 14832645.7, dated Feb. 17, 2017.
(Continued)

*Primary Examiner* — Joseph A Dillon, Jr.
(74) *Attorney, Agent, or Firm* — Birch, Stewart, Kolasch & Birch, LLP

(57) ABSTRACT

Method for feeding in and for handling waste material in the channel section of a pneumatic wastes conveying system, in which method waste material or recycleable material is fed into a feed-in container (10) from the input aperture (2) of at least two input points (1) of a pneumatic pipe transport system for material and onwards into the channel section (20, 21, 22) between the feed-in container and the material conveying pipe (100), from where the material is conveyed along with the transporting air via the material conveying pipe (100) to the delivery end of the pneumatic material conveying system, where the material is separated from the transporting air. In the method the channel section (20(II), 20(III), 20(IV) . . . (22(II), 22(III), 22(IV)) of at least one second input point is connected to the channel section (20(I), 21(I), 22(I)) of one first input point between the input point (1) and an impeding means (30, 30'), in that in the method at least a part of the material (w1, w2, w3, w4) fed in is acted (Continued)

upon by the combined effect of suction and replacement air in the channel section (20(I), 21(I), 22(I) . . . (20(IV), 21(IV), 22(IV)) by bringing about compression in size in at least a part of the material (w1, w2, w3, w4) being conveyed, by means of an impediment (30) arranged between the conveying pipe (100) and the material (w1, w2, w3, w4) to be handled, or against the impediment, before transportation of the material to the delivery end of the pneumatic transport system for wastes.

18 Claims, 14 Drawing Sheets

(51) Int. Cl.
   *B65F 1/10* (2006.01)
   *B65F 5/00* (2006.01)

(58) Field of Classification Search
   USPC .............................. 406/130, 132, 151, 152
   See application file for complete search history.

(56) References Cited

U.S. PATENT DOCUMENTS

| | | | | |
|---|---|---|---|---|
| 3,933,393 | A * | 1/1976 | De Feudis | B65F 5/005 406/130 |
| 3,948,167 | A * | 4/1976 | De Feudis | B30B 9/3042 100/215 |
| 4,099,457 | A * | 7/1978 | Hyden | B30B 9/3089 100/215 |
| 4,108,498 | A | 8/1978 | Bentsen | |
| 4,589,592 | A * | 5/1986 | Wassdahl | B65G 53/24 232/43.1 |
| 4,987,988 | A * | 1/1991 | Messina | B65F 1/0093 186/3 |
| 4,993,882 | A * | 2/1991 | Nishizuka | E04F 17/10 406/117 |
| 4,995,765 | A * | 2/1991 | Tokuhiro | B65F 5/005 209/580 |
| 5,031,829 | A * | 7/1991 | Shantzis | B65F 1/0093 209/706 |
| 5,083,704 | A * | 1/1992 | Rounthwaite | B65F 1/0093 15/314 |
| 5,316,152 | A * | 5/1994 | Ross | B65F 1/0093 209/630 |
| 6,322,295 | B1 * | 11/2001 | Gabriele | B65G 51/02 406/151 |
| 6,712,561 | B1 * | 3/2004 | Valerino, Sr. | B09B 3/0075 406/117 |
| 8,534,309 | B2 * | 9/2013 | Metzger | F16K 27/044 137/240 |
| 2005/0028689 | A1 * | 2/2005 | Callegaro | B30B 9/305 100/104 |
| 2010/0218336 | A1 * | 9/2010 | Kilhlstrom | B65F 5/005 15/301 |
| 2010/0303559 | A1 * | 12/2010 | Sundholm | B65F 5/005 406/122 |
| 2010/0310326 | A1 | 12/2010 | Sundholm | |
| 2011/0013993 | A1 | 1/2011 | Sundholm | |
| 2011/0290619 | A1 * | 12/2011 | S.Ratnam | B65F 1/0093 198/500 |
| 2013/0243536 | A9 * | 9/2013 | Arrabal | B65G 51/00 406/117 |
| 2016/0145042 | A1 * | 5/2016 | Sundholm | B65G 53/46 100/41 |

FOREIGN PATENT DOCUMENTS

| | | |
|---|---|---|
| CN | 1924253 A | 3/2007 |
| CN | 101842305 A | 9/2010 |
| CN | 101903268 A | 12/2010 |
| CN | 101977832 A | 2/2011 |
| EP | 1498364 | 1/2005 |
| EP | 1555223 A1 | 7/2005 |
| FR | 2439732 A1 | 5/1980 |
| JP | 54-79780 U | 6/1979 |
| JP | 54-109375 C | 8/1979 |
| JP | 55-6734 Y2 | 2/1980 |
| JP | 55-40110 A | 3/1980 |
| JP | 60-36908 U | 3/1985 |
| JP | 5-132107 A | 5/1993 |
| JP | 8-282803 A | 10/1996 |
| JP | 2011-508709 A | 3/2011 |
| JP | 2013-519603 A | 5/2013 |
| KR | 10-2010-0109700 A | 10/2010 |
| WO | WO 03/057596 A1 | 7/2003 |
| WO | WO 2005/084509 A1 | 9/2005 |
| WO | WO 200608078 A1 | 8/2006 |
| WO | WO 2007/135237 A1 | 11/2007 |
| WO | WO 2009/080880 A1 | 7/2009 |
| WO | WO 2009/080881 A1 | 7/2009 |
| WO | WO 2009/080882 A1 | 7/2009 |
| WO | WO 2009/080883 A1 | 7/2009 |
| WO | WO 2009/080884 A1 | 7/2009 |
| WO | WO 2009/080885 A1 | 7/2009 |
| WO | WO 2009/080886 A1 | 7/2009 |
| WO | WO 2009/080887 A1 | 7/2009 |
| WO | WO 2009/080888 A1 | 7/2009 |
| WO | WO 2010/029213 A1 | 3/2010 |
| WO | WO 2011/098666 A1 | 8/2011 |
| WO | WO 2011/098667 A2 | 8/2011 |
| WO | WO 2011/098668 A2 | 8/2011 |
| WO | WO 2011/098669 A2 | 8/2011 |
| WO | WO 2011/110740 A2 | 9/2011 |

OTHER PUBLICATIONS

International Search Report, issued in PCT/FI2014/050597, dated Nov. 26, 2014.
Written Opinion of the International Searching Authority, issued in PCT/FI2014/050597, dated Nov. 26, 2014.
Office Action issued in corresponding China Application No. 201480043089.8 dated Dec. 14, 2016 (in English).

* cited by examiner

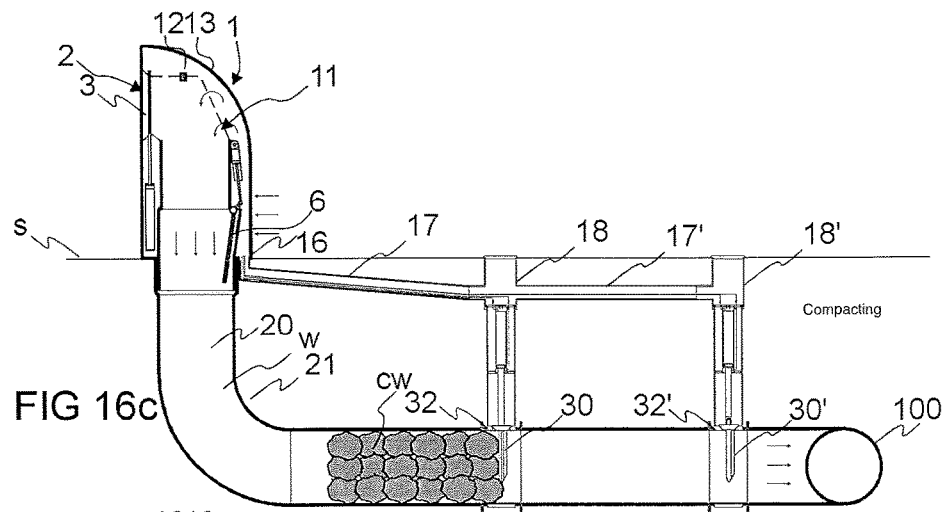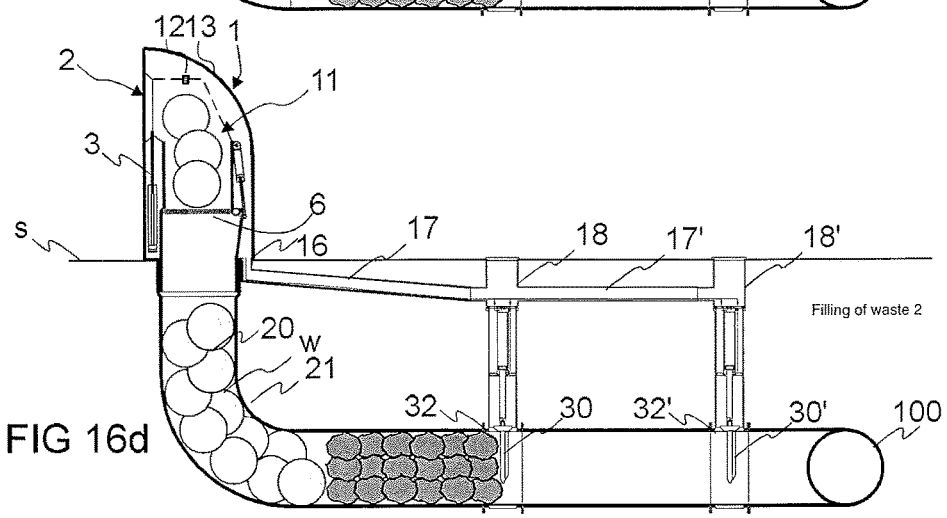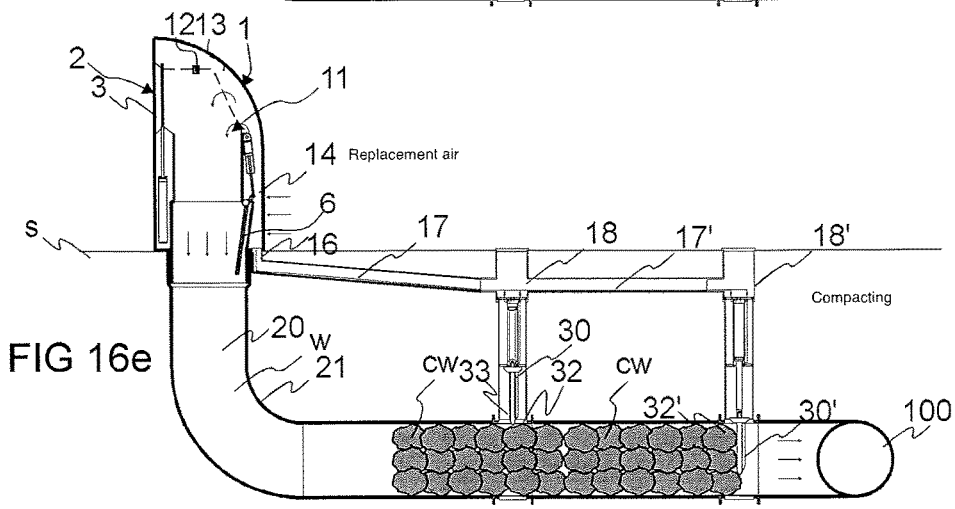

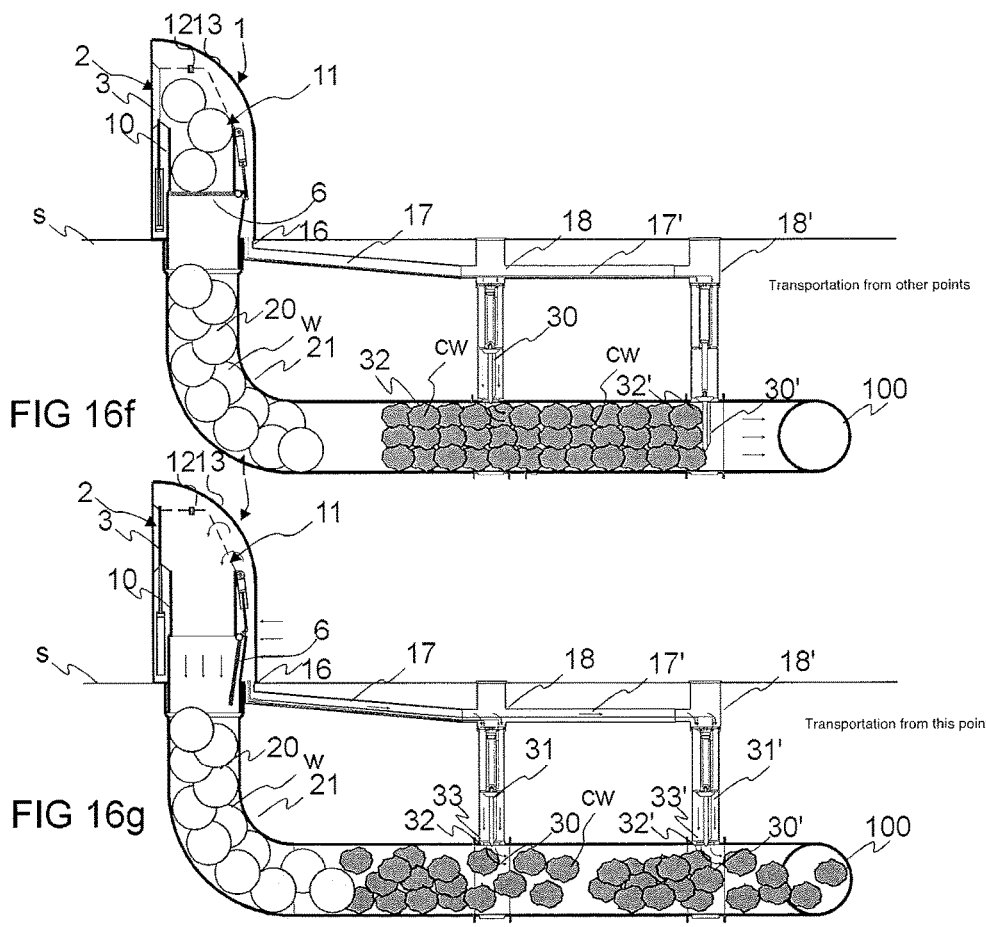

US 10,399,799 B2

METHOD AND APPARATUS FOR FEEDING IN AND HANDLING WASTE MATERIAL

CROSS-REFERENCE OF RELATED APPLICATIONS

This application is a National Phase of International Patent Application No. PCT/FI2014/050597, filed on Jul. 29, 2014, which claims the benefit under 35 U.S.C. § 119(a) to Finland Patent Application Nos. 20135801, filed on Jul. 30, 2013, and 20136141, filed on Nov. 18, 2013, all of which are hereby expressly incorporated by reference into the present application.

FIELD OF THE INVENTION

The object of the invention is a method for feeding in and for handling waste material in the channel section of a pneumatic waste conveying system.

Another object of the invention is an apparatus for feeding in and for handling waste material in the channel section of a pneumatic waste conveying system.

The invention also relates to a system that uses the apparatus for feeding in and for handling waste material in the channel section of a pneumatic waste conveying system.

BACKGROUND OF THE INVENTION

The invention relates generally to material conveying systems, such as to pneumatic partial-vacuum transporting systems, more particularly to the collection and conveying of wastes, such as to the conveying of household wastes. Such systems are presented in publications WO 2009/080880, WO 2009/080881, WO 2009/080882, WO 2009/080883, WO 2009/080884, WO 2009/080885, WO 2009/080886, WO 2009/080887 and WO 2009/080888, among others. The invention also relates to waste feeding means, such as to input points or refuse chutes, with which waste is conveyed, typically by gravity, e.g. from higher input apertures in residential buildings to a lower collection space or corresponding container.

Systems wherein wastes are conveyed in piping by means of a pressure difference or suction are known in the art. In these, wastes are conveyed long distances in the piping by sucking. It is typical to these systems that a partial-vacuum apparatus is used to achieve a pressure difference, in which apparatus negative pressure is brought about in the conveying pipe with partial-vacuum generators, such as with a fan, with vacuum pumps or with an ejector apparatus. A conveying pipe typically comprises at least one valve means, by opening and closing which the replacement air coming into the conveying pipe is regulated. Waste input points, e.g. rubbish containers or refuse chutes, are used in the systems at the waste material input end, into which waste input points material, such as waste material, is fed and from which waste input points the material to be conveyed is conveyed into a conveying pipe by opening a discharge valve means, in which case, by means of the sucking effect achieved by the aid of the partial vacuum acting in the conveying pipe and also by means of the surrounding air pressure acting via the refuse chute, material such as e.g. waste material packed into bags, is conveyed from the refuse chute into the conveying pipe and onwards to a reception point, where the material to be transported is separated from the transporting air and conveyed for further processing or e.g. into a shipping container. The pneumatic waste conveying systems in question can be utilized particularly well in densely populated urban areas. These types of areas have tall buildings, in which the input of wastes into a pneumatic conveying system for wastes is performed via an input point, such as a refuse chute arranged, in the building.

Material can be conducted from an input point along a refuse chute into a container that is lower in the vertical direction, or an intermediate container can be in connection with the input points, into which intermediate container material fed from an input point is initially conducted and from where the waste material is conveyed onwards along the conveying piping to a reception point.

The volume of the intermediate container between the input aperture of a waste input point and the discharge valve typically varies according to the embodiment. Typically the volume can be 100-600 l. An advantage of using an intermediate container is that it can increase the capacity of the input point, in which case the actual conveying system does not need to be started often. Depending on the application site, the conveying system is used 1-3 times a day to convey the material that has collected in the intermediate container. An advantage of a conventional intermediate container is also that the energy consumption of the conveying system can be reduced, because more waste can be conveyed with the same conveying cycle. One drawback, among others, of prior art solutions is that the space requirement of an intermediate container, especially when an input pipe is used as an intermediate container, is large. Typically an input pipe applied in a vertical attitude as an intermediate container becomes long, and a rather deep excavation to install it in the ground must be arranged. The excavation work is expensive, particularly in rocky areas where blasting is required for achieving a trench. The excavation work is expensive, particularly in rocky areas where blasting is required for achieving a trench. The installation depth of a typical intermediate container according to solutions known in the art is in the region of 2.5-3.5 m. The typical installation depth in the installation of the conveying piping of a pneumatic wastes conveying system is smaller than this, in the region of 1-1.5 m.

In addition, waste or recyclable material intended for conveying is very different in terms of its volume. Different categories of waste therefore set requirements for the input points of waste input stations. Categories of material that take up a lot of space can require many input points, and intermediate containers connected to them. The aim of the present invention is to achieve a completely new type of solution in connection with the intermediate containers of the input points and conveying pipings of a wastes conveying system, by means of which solution the drawbacks of prior art solutions are avoided. One aim of the invention is to achieve a solution with which the capacity of an intermediate container can be utilized more efficiently than earlier.

BRIEF DESCRIPTION OF THE INVENTION

The method according to the invention is for feeding in and for handling waste material in the channel section of a pneumatic wastes conveying system wherein the waste material or recycleable material is fed into a feed-in container (10) from an input aperture (2) of at least two input points (1) of a pneumatic pipe transport system for material and onwards into the channel section (20, 21, 22) between the feed-in container and the material conveying pipe (100). The material is the conveyed along with the transporting air via the material conveying pipe (100) to the delivery end of the pneumatic material conveying system, where the material is separated from the transporting air. The method steps include connecting the channel section (20(II), 20(III), 20(IV) . . . (22(II), (22(III), 22(IV)) of at least one second input point to the channel section (20(I), 21(I), 22(I)) of one first input point between the input point (1) and an impeding means (30, 30'). Acting upon at least a part of the material (w, w1, w2, w3, w4) fed in by the combined effect of suction and replacement air in the channel section (20(I), 21(I), 22(I) . . . 20(IV), 21(IV), 22(IV)). Bringing about compression in size in at least a part of the material (w, w1, w2, w3, w4) being conveyed, by means of an impediment (30) arranged between the conveying pipe (100) and the material (w, w1, w2, w3, w4) to be handled, or against the impediment and transporting the material to the delivery end of the pneumatic transport system for wastes.

The apparatus according to the invention is for feeding in and for handling waste material in the channel section of a pneumatic wastes conveying system. The apparatus comprises at least two input points (1) of a pneumatic pipe transport system for material, each of which input points comprises an input aperture (2) into a feed-in container (10), and onwards into the channel section (20, 21, 22) arranged between the feed-in container and the material conveying pipe (100). The channel section is adapted to function as an intermediate container, from which the material is adapted to be conveyed via a material conveying pipe (100) to the delivery end of the pneumatic wastes conveying system, where the material is separated from the transporting air. The apparatus can be connected to the conveying pipe (100), into which the suction side of a partial-vacuum generator can be connected to act. The apparatus comprises at least one impeding means (30), which can be arranged between an input point (1) and the conveying pipe (100) in the channel section (20(I), 21(I), 22(I) . . . 20(IV), 21(IV), 22(IV)) of each input point. The impediment is adapted to stop at least most of the material and to let an air flow past or through in such a way that in the channel section (20(I), 21(I), 22(I) . . . 20(IV), 21(IV), 22(IV)) compression in size can be achieved, by means of the impediment (30), or against the impediment, by the combined effect of suction and replacement air, for at least a part of the material (w) that is intended for conveying. The channel section (20(II), 20(III), 20(IV) . . . (22(II), (22(III), 22(IV)) of at least one second input point is connected to the channel section (20(I), 21(I), 22(I)) of one first input point between the input point (1) and the impeding means (30, 30').

The system according to the invention that uses the apparatus according to the present invention.

The solution according to the invention has a number of important advantages. By means of the invention the compacting, i.e. compressed size, of the waste material is achieved, in which case more material than earlier fits into the intermediate container. The compression in size can, depending on the application site, be in the region of 30-70%, depending on the type of waste and on the type of recycleable material. An intermediate container can also be disposed in a horizontal attitude or it can comprise a horizontal section, in which case a deep installation pit is not needed for it, but instead a conventional excavation depth can be used for the waste conveying piping. By arranging the channel section of the intermediate container of one material category to be such that the channel sections of the intermediate container of at least one other input point, typically of all the input points of the feed-in station, connect to it, a collection piping assembly is achieved wherein the intermediate container of the material category requiring most intermediate container volume can be formed, on the one hand, in a shallow space, but however large in volume. In this case the number of input points for the material category can at the same time be limited. Compression of the material is thus achieved as the combined effect of replacement air and of the suction brought about by a partial-vacuum generator of the pneumatic conveying system for wastes when the material is compressed against an impediment. The impediment can be a means arranged between the intermediate container section and the conveying pipe, through which or around the sides of which means an air flow is able to travel. The impediment acts on the material by bringing about a support effect in it, which mainly prevents, to at least a significant extent, the passage of the material past or through the impediment. With the solution according to the invention an intermediate container of the desired size can be achieved, the material being fed into which container can be compressed in size by means of one or more impediments and an air flow. The entry of replacement air can be regulated e.g. with a separate replacement air valve arranged in the container part of an input point. By opening and closing the replacement air valve, the start of movement of material in the intermediate container can be regulated. By arranging a replacement air valve to open and close the pathway of replacement air, the flow cross-sectional area of which is smaller than the flow cross-sectional area of the channel part to which it is connected and from which the suction acts, a sufficient replacement air flow for compression is achieved. At the same time the material of the intermediate containers of a number of input points can be compressed, i.e. compacted, simultaneously, in which case considerable savings in time and energy are achieved. The compression can be performed at least partly at the same time as material is conveyed from some other input point or intermediate container of the system. A separate replacement air valve can also be used as a pilot valve, i.e. by opening first the replacement air valve and only then the discharge valve or larger shut-off means. In this case a possible pressure shock and/or noise problem can be reduced. Another advantage achieved is that opening of the actual discharge valve is possible with a smaller force than without a pilot valve. According to one embodiment the impediment is a force-receiving means arranged in the container space of the intermediate container, which means can be placed into the container space and displaced out of it with a drive device. Depending on the application site, the impediment can also be a shaper of the material, e.g. a formatter. According to one embodiment of the invention means for bringing replacement air into the vicinity of the impediment can be arranged in connection with an impediment, at least when material is conveyed in the conveying piping after the removal of the impediment. In this case replacement air can be brought into the bulk of material being conveyed, which boosts the conveying efficiency of material in the conveying pipe. In the method according to the invention material categories can be efficiently conveyed with an arrangement wherein, in the displacements of a number of material categories, a material category that cleans the conveying piping is conveyed now and then, e.g. after biodegradable waste paperboard is conveyed, or after mixed waste paper is conveyed.

According to the invention input points, which are the input points of waste, such as waste receptacles or refuse chutes, can be used for feeding in material. The method and apparatus according to the invention are particularly well suited in connection with conveying systems of waste material, such as waste material arranged in bags.

BRIEF DESCRIPTION OF THE FIGURES

In the following, the invention will be described in more detail by the aid of an embodiment with reference to the attached drawings, wherein

FIGS. 16a-16g present an apparatus according to an embodiment of the invention, in different operating states,

DETAILED DESCRIPTION OF THE INVENTION

Figure 1:
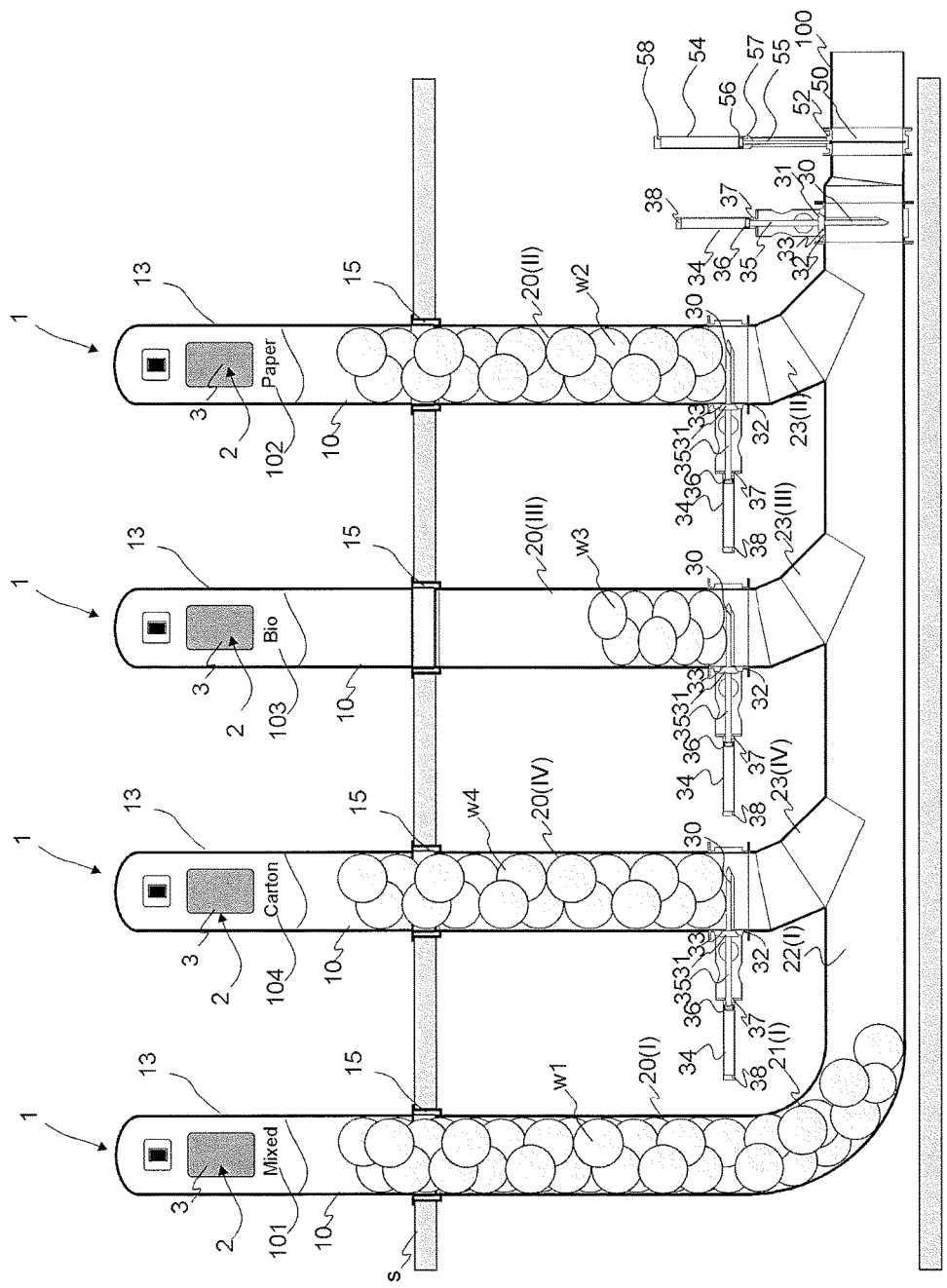
FIG. 1 presents a simplified and partially sectioned embodiment of an apparatus according to the invention, in a first operating state.

FIGS. 1-8 present a simplified view of an apparatus according to the invention. The apparatus typically comprises at least one feed-in station, which comprises a number of input points 1. FIGS. 1-8 present a feed-in station of a pneumatic pipe transport system for wastes, which station comprises at least two input points 1. In the embodiment of the figure there are four input points 1. The input points 1 are typically for a number of different categories of material. FIGS. 1-8 thus present four input points 1, each of which in the embodiment of the figure is intended for a different category of material. Depending on the application site, there can be more or fewer input points in the feed-in station. Also there can be a higher or lower number of material categories intended for feeding into the input points 1 of the feed-in station. The input points 1 intended for different material categories are marked in the figures with the different reference numbers 101, 102, 103, 104. The material categories w1, w2, w3, w4 are, in the embodiment of FIG. 1: w1 mixed waste, w2 paper, w3 biodegradable waste and w4 paperboard. Depending on the application site there can also be other material categories, e.g. plastic, glass, metal, et cetera. In each input point 1 is an input aperture 2 for feeding material w1, w2, w3, w4, such as waste material or recycleable material, into a feed-in container 10 of the input point and onwards via an intermediate container 20, 21, 22 into the material conveying pipe 100. The channel parts of the intermediate container of each input point are marked in the figures in such a way that: the channel parts of the first input point 101 are 20(I), 21(I), 22(I), the channel parts of the second input point are 20(II), 21(II), 22(II) and correspondingly, the channel parts of the third input point are 20(III), 21(III), 22(III) and the channel parts of the fourth input point are 20(IV), 21 (IV), 22(IV). An openable and closable hatch 3 or corresponding is in connection with the input aperture 2 in the embodiment of the figure, which hatch when closed covers the input aperture 2 and when opened enables the feeding of material w via the input aperture into the container space of an input point and onwards into the intermediate container. An actuator, such as a cylinder-piston combination, for example, is arranged to drive the hatch 3 of the input aperture, to which actuator the hatch 3 is arranged movably between at least two positions, a first position, in which it covers the input aperture 2, and a second position, in which the input aperture is open. It can be conceived that the hatch in some embodiments can be manually openable and closable.

In the figures the input point 1 is arranged above a mounting surface s, such as above the ground surface or floor level. A channel, such as a coupling section, extends from the feed-in container 10 of an input point into the channel part 20 that is below the surface s. A coupling part 15 is between the feed-in container 10 and the intermediate container formed by the channel part 20, with which coupling the feed-in container is connected to the intermediate container 20.

An input point has an enclosure 13, which forms the outer walls of the input point. An input aperture 2 is formed in the enclosure 13, as also are apertures 14 (presented in FIG. 9) for conducting replacement air to inside the enclosure.

FIGS. 1-8 thus present four parallel input points 1, each of which has its own intermediate container section 20 as an extension of the feed-in container 10 in the direction of travel of the material. The intermediate container sections of the different input points are hereinafter marked with the numbers 20(I), 20(II), 20(III) and 20 (IV). The channel sections forming the intermediate containers of the input points are formed into an arrangement in which the intermediate container of one first input point 101 is formed from the channel parts 20(I), 21(I), 22 (I) between the input point 101 and the actual conveying pipe 100. In the embodiment of the figures the intermediate container 20(I) comprises firstly a vertical channel section 20 (I) connected to the coupling part 15 of the input point and a curving channel section 21(I), that joins the vertical channel section to the horizontal channel section 22(I) of the intermediate container.

An impeding means 30 is arranged in the intermediate container section of the first input point, most suitably in the horizontal channel section 22(I), between the input point 1 and the conveying pipe 100, which impeding means in the embodiment of FIG. 1 is movable with drive means 34, 35 between at least two positions. Typically an impeding means 30 can be moved between a first position, in which the impeding means 30 extends into the material passage space of the channel part of the intermediate container, and a second position, in which the impeding means does not essentially extend into the material passage space of the channel part of the intermediate container. The impeding means 30 is adapted to allow in the first position a replacement air flow past or through the impeding means but to prevent the passage of at least most of the material w1, w2, w3, w4 intended for conveying past or through the impeding means towards the conveying pipe 100.

The intermediate container 20(II) of the second input point 102 is connected, e.g. with a coupling part 23(II) to the intermediate container 20(I) of the first input point 101, most suitably to the channel section 22(1). The intermediate container 20(III) of the third input point 103 is connected, e.g. with a coupling part 23(III) to the intermediate container 20(I) of the first input point 101, most suitably to the channel section 22(I), and the intermediate container 20(IV) of the fourth input point 104 is connected, e.g. with a coupling part 23(IV) to the intermediate container 20(I) of the first input point 101, most suitably to the channel section 22(I). The intermediate container 20(II) of the second input point 102 is therefore connected into a medium connection with the intermediate container of the first input point. The intermediate container 20(II) of the second input point is connected to the intermediate container 20(I) of the first input point 101, most suitably to the channel section 22(I) of it, before the impeding means 30 in the material conveying direction. Correspondingly, the intermediate containers 20 (III), 20(IV) of the third and fourth input points are connected into a medium connection with the intermediate container 20(I) of the first input point, most suitably to the channel section 22(I), in the material conveying direction before the impeding means 30 that is arranged in the channel section 22(I). In the embodiment of the figure the channel sections of the intermediate container of the second input point, third input point and fourth input point are thus connected, in the figure, from their bottom parts, to the channel section 22(I), which in the figure is horizontal, of the intermediate container of the first input point.

In the embodiment of FIGS. 1-8, an impeding means 30 can be arranged in the channel of the intermediate container 20(II) of the second input point, which impeding means can typically be moved between a first position, in which the impeding means 30 extends into the material passage space of the channel part of the intermediate container, and a second position, in which the impeding means does not essentially extend into the material passage space of the channel part of the intermediate container. In a corresponding manner, an impeding means 30 can also be arranged in the channel of the intermediate container 20(III) of the third input point and in the channel of the intermediate container 20(IV) of the fourth input point, which impeding means can typically be moved between a first position, in which the impeding means 30 extends into the material passage space of the channel part of the intermediate container, and a second position, in which the impeding means 30 does not essentially extend into the material passage space of the channel part of the intermediate container.

In the embodiment of FIGS. 1-8, the intermediate container of the first input point 101 is in practice larger compared to the intermediate containers of the second, third and fourth input points, because it comprises a long channel section 22(1), which in the figure is horizontal.

In the embodiment of FIGS. 1-8, a possible discharge valve 50 of an input point/some input points and/or of an intermediate container/some intermediate containers is arranged in the direction of travel of the material only after the impeding means 30 of the channel section 22(I), typically in the section on the conveying pipe 100 side. In this case the input point does not need a valve between the input point and the intermediate container. According to the figures, a hatch 3 is in connection with the input aperture 2 of an input point 1, which hatch is opened and closed e.g. with a drive device. When the hatch 3 is open the material w1 . . . w4 can be fed via the input aperture 2 into the feed-in container 10 of an input point, from where the material is displaced mainly by gravity at first into the first channel part 20 of the intermediate container, which channel part in the figure is mainly vertical. After the vertical channel section of the first input point is a curved channel section 21(I), which connects to the horizontal channel section 22(I) of the intermediate container. Between the horizontal channel section 22(I) and the conveying pipe 100 is an impeding means 30, and the discharge valve 50 is arranged between the impeding means 30 and the conveying pipe. The shut-off means 50 of the discharge valve has at least two positions, a first position, in which case the pathway from the intermediate container into the conveying pipe 100 is closed and a second position, in which case the pathway from the intermediate container into the conveying pipe is open. The drive device of the discharge valve is a cylinder-piston combination 54, 55 in the figure. The discharge valve is arranged with a joint part 52 in the channel section between the channel section 22(I) of the intermediate container and the conveying pipe 100, e.g. with a flanged joint or with some other suitable joining method. The discharge valve can be e.g. a gate valve of the type presented in publication WO2007135237A1 or in publication WO2010029213A1, which possibly also comprises means for cleaning the space between the walls of the valve body with pressure medium.

FIG. 1 presents a situation in which material w1, w2, w3, w4, which is described in the figure in a simplified manner as balls, has been fed into each input point. The material of the first input point has traveled mainly by gravity to the vertical section 20(I) and to the curved section 21(I) and right to the starting end of the horizontal section 22(I) of the intermediate container. The material in the intermediate container 20(II), 20(III), 20(IV) of the second, third and fourth input point has traveled in the intermediate container up to the impeding means 30 arranged in each channel section.

Different material categories w1, w2, w3, w4 have different properties. For example, the proportion of the total amount of waste being fed in varies for each material category. Also their compactability when compressed varies. In the embodiment of FIG. 1, the most infeed (by volume) in the situation of FIG. 1 is the material category w1, e.g. mixed waste, of the first input point 101. Roughly the same amounts (by volume) have been infed in the situation of FIG. 1 of the second material category w2, e.g. paper, being fed in via the second input point 102, and the fourth material category w4, e.g. paperboard, being fed in via the fourth input point 104. In the embodiment of FIG. 1 the least infeed (by volume) is the third material category w3, e.g. biodegradable waste, which has been fed in via the third input point 103. The intermediate container already has rather a lot of material w2, w4 in the intermediate containers 20(II), 20(IV) of the first, second and fourth input points, in which case a situation starts to approach wherein no more material can be infed in the situation in question. On the other hand, material w3 will still easily fit into the third input point, into the intermediate container 20(III) of it.

The suction side of the partial-vacuum generator in pneumatic waste conveying systems is connected to act in the conveying pipe 100. The suction is not, however, able to act in the situation of FIG. 1 because the shut-off means of the valve means 50 is in the position in which it closes the connection from the conveying pipe 100 into the horizontal channel section 22(I) of the first intermediate container.

Figure 2:
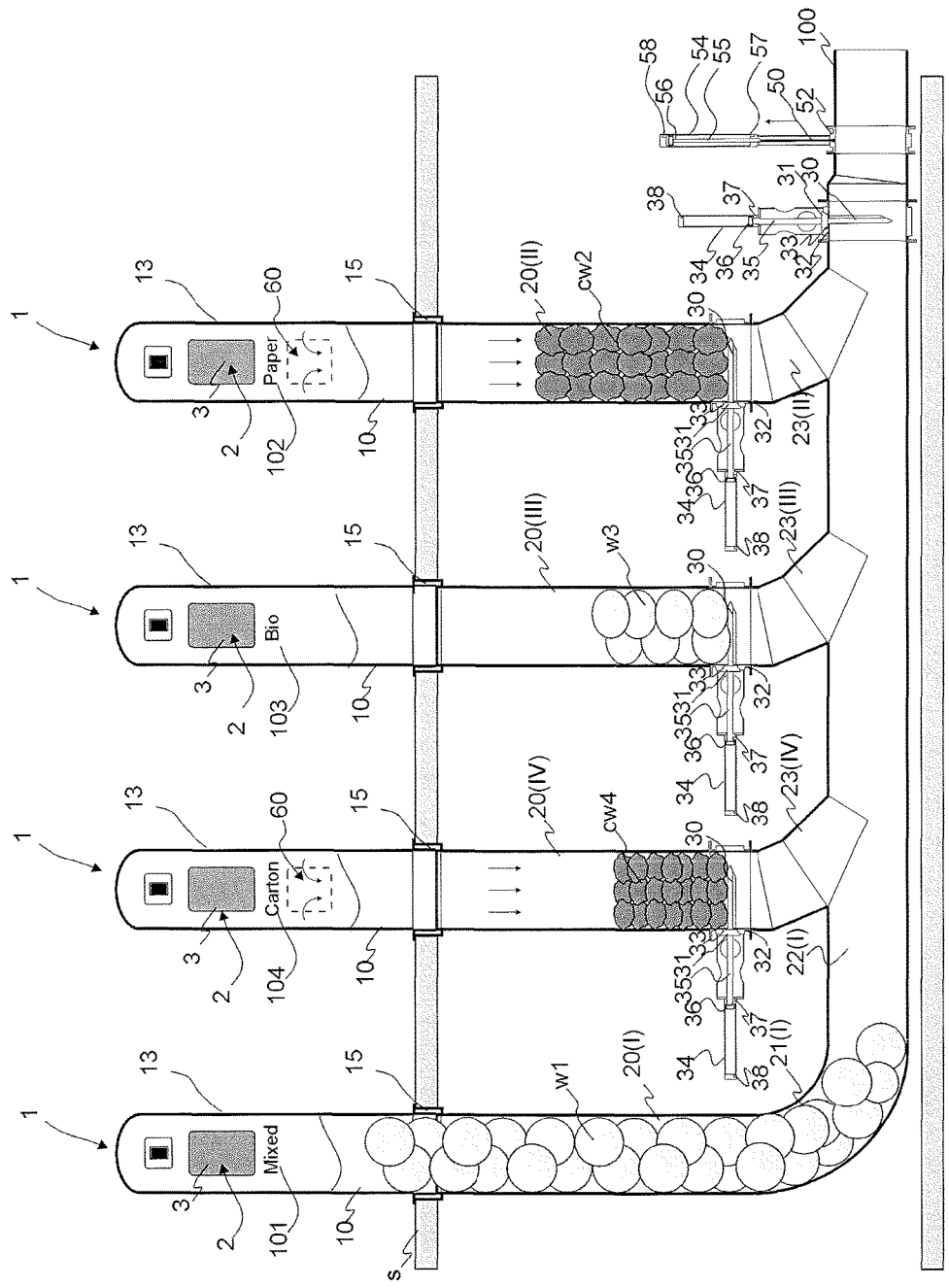
FIG. 2 presents a simplified and partially sectioned embodiment of an apparatus according to the invention, in a second operating state.

FIG. 2 presents an operating state in which the shut-off means 50 of the discharge valve has been displaced by the drive device 54, 55, 56 into the second position, in which case the suction of the partial-vacuum generator from the direction of the conveying pipe 100 is able to act via the horizontal channel section 22(I).

When in the figure the replacement air valve 60 of the second input point 102 and correspondingly of the fourth input point is opened, the suction is able to act together with replacement air on the material category w2 that is in the intermediate container 20(II) of the second input point and correspondingly on the material category w4 that is in the intermediate container 20(IV) of the fourth input point compressing it against the impeding means 30, in which case the material compacts, i.e. condenses, in the intermediate container. In this case the discharge valve 50 is opened for a while for compacting against the impeding means 30 the material conveyed into the intermediate container by gravity. Typically the discharge valve is opened for a certain time, depending on the application site, e.g. for 5-10 seconds. When the impediment 30 arranged in the channel section of the intermediate container is in the channel section of the intermediate container, it essentially therefore prevents the displacement of waste material past the impediment 30 towards the conveying pipe 100. In this case the waste material w compacts, i.e. compresses together and against the impediment, from the combined effect of the suction and replacement air flow. As a result of the compression, the volume of the waste material in the intermediate container decreases significantly, depending on the embodiment and on the properties of the waste material. In one case the volume of the compacted waste material cw has been reduced by 30-50% compared to the volume before compacting. In FIG. 2 the material cw2 in the intermediate container 20(II) of the second input point has been compacted, i.e. condensed, and correspondingly in the intermediate container 20(IV) of the fourth input point is compacted material cw4.

Figure 3:
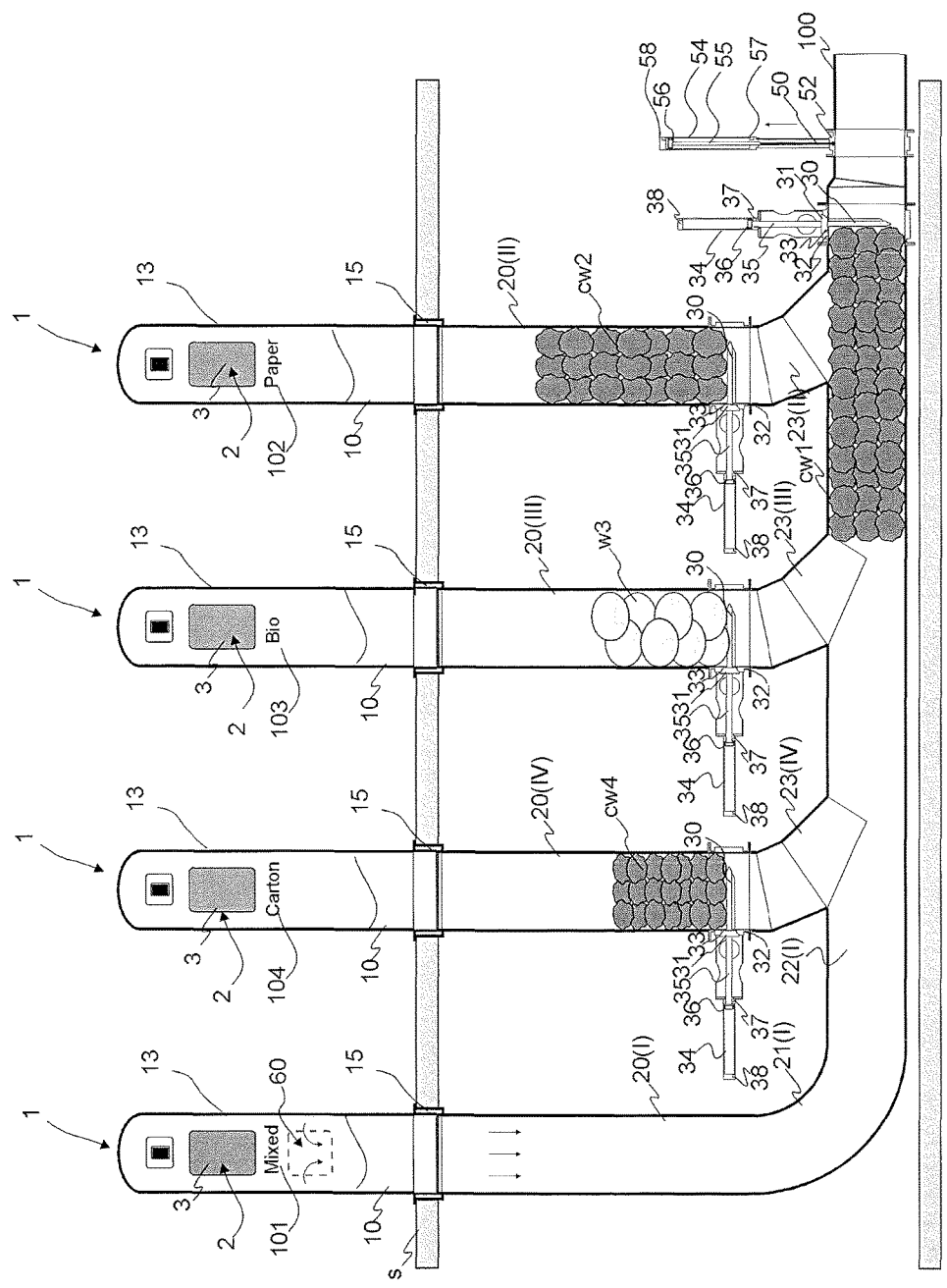
FIG. 3 presents a simplified and partially sectioned embodiment of an apparatus according to the invention, in a third operating state.

FIG. 3 presents an operating state, in which the replacement air valve 60 of the second input point 102 and the replacement air valve 60 of the fourth input point 104 are closed and correspondingly the replacement air valve 60 of the first input point 101 is open. When the shut-off means of the discharge valve 50 is in the second position and suction is able to act from the direction of the conveying pipe, the material w1 that is in the intermediate container of the first input point 101 displaces towards the conveying pipe in the horizontal channel section 22(I) of the intermediate container and against the impeding means 30. When the impediment 30 arranged in the channel section 22(I) of the intermediate container is in the channel section of the intermediate container, it essentially prevents the displacement of waste material past the impediment 30 towards the conveying pipe 100. In this case the waste material w1 compacts, i.e. compresses together and against the impediment 30, from the combined effect of the suction and replacement air flow. As a result of the compression, the volume of the waste material in the intermediate container 22(I) decreases significantly, depending on the embodiment and on the properties of the waste material. In one case the volume of the compacted waste material cw1 has been reduced by 30-50% compared to the volume before compacting. Materials that compact well are e.g. plastic bottles, which in some embodiments can form their own material category.

Figure 4:
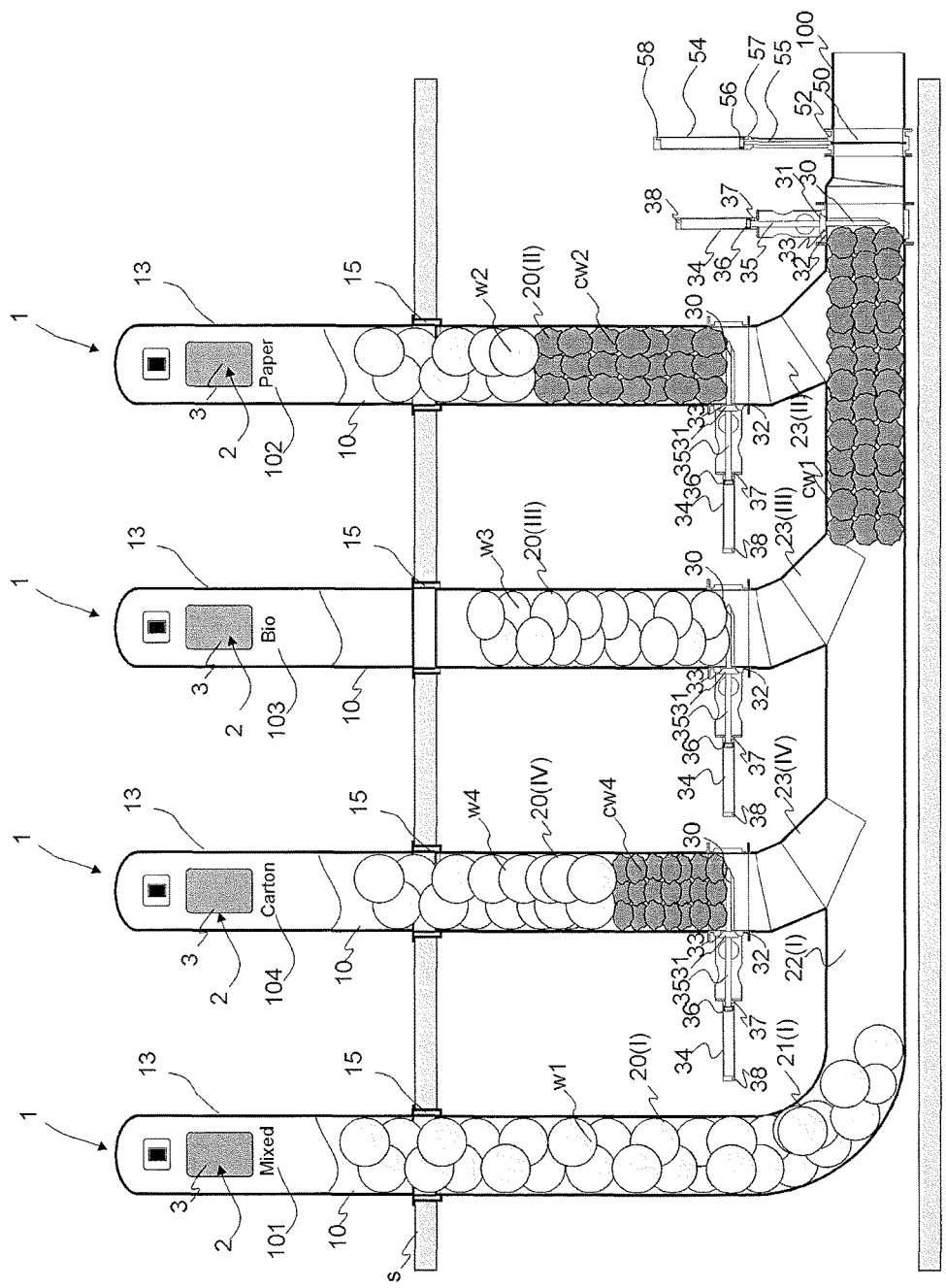
FIG. 4 presents a simplified and partially sectioned embodiment of an apparatus according to the invention, in a fourth operating state.

Following the operating state of FIG. 3 is the operating state of FIG. 4, in which the shut-off means 50 of the discharge valve has been displaced into the first position, in which it closes the connection from the conveying pipe 100 into the channel section 22(I) of the intermediate container. In this case suction is not able to act in the intermediate containers and the material w1, w2, w3, w4 can again be fed from an input aperture of the input points for conducting onwards into the intermediate containers 20(I), 20(II), 20(III), 20(IV). There is space in the intermediate containers owing to the compacting of material performed in the preceding operating states. Additional material is infed, in the normal manner, in addition to the material already in the intermediate container and on top of the material possibly already compacted.

When sufficient material has been fed in, or it is otherwise desired to perform emptying of the intermediate containers of the input points of the feed-in station into the conveying pipe, e.g. the emptying sequence hereinafter can be followed.

Figure 5:
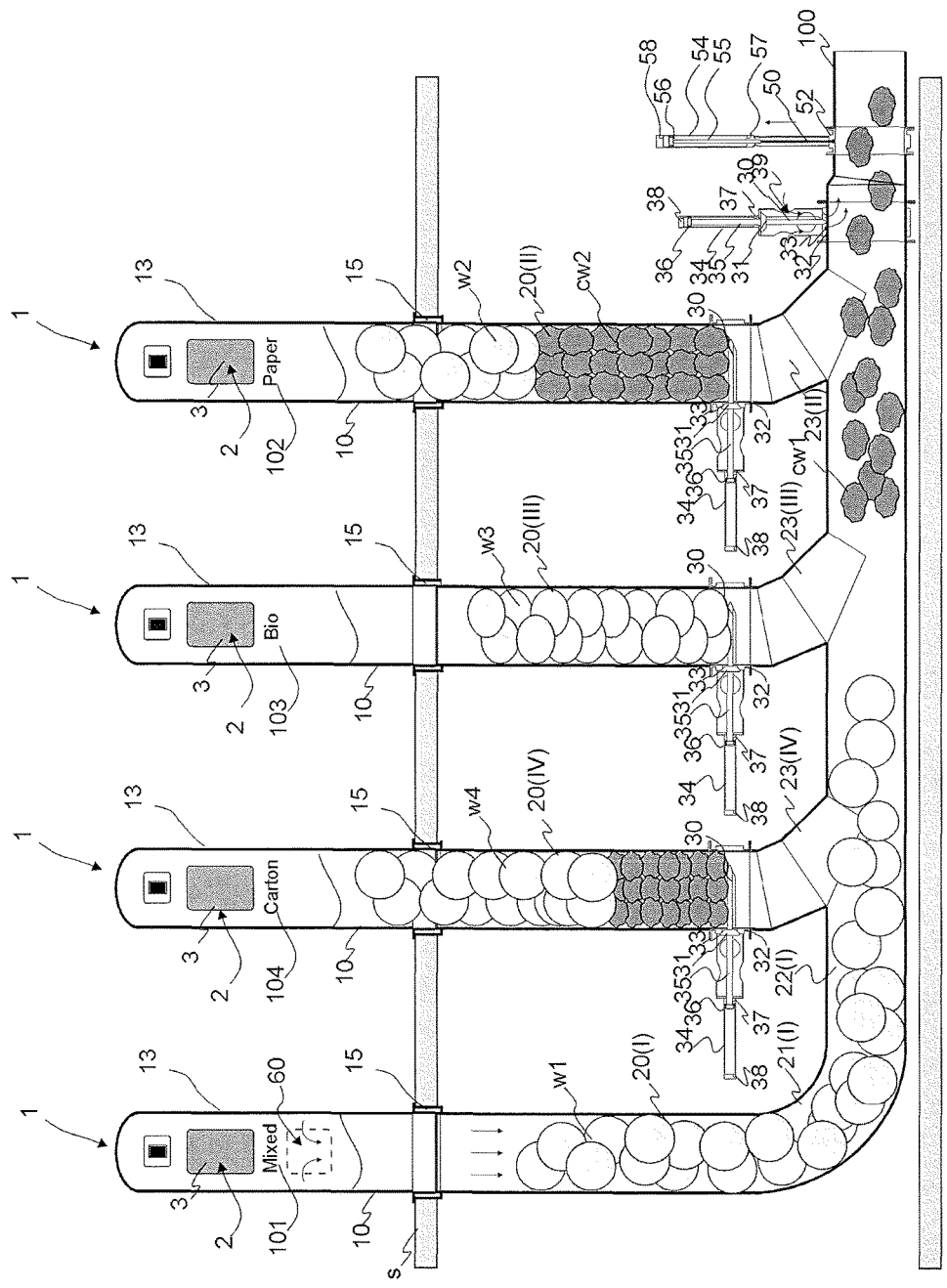
FIG. 5 presents a simplified and partially sectioned embodiment of an apparatus according to the invention, in a fifth operating state

FIG. 5 presents the emptying of the intermediate container of the first input point 101. The impeding means 30 is displaced into the second position, in which it does not extend into the channel space 22(I) of the intermediate container. The discharge valve 50 is opened by displacing the shut-off means into the second position, in which case the suction of a partial-vacuum generator is able to act from the conveying pipe into the channel space 22(I) of the intermediate container. The replacement air valve 60 of the first input point 101 is opened, in which case the material w1, cw1 starts to displace from the effect of suction and a replacement air flow towards the conveying pipe 100. Replacement air is also brought into the medium channel 22(I) from the replacement air inlet aperture 33 formed in the impeding means 30. In the embodiment of the figure the first material category to be emptied is mixed waste w1.

Figure 6:
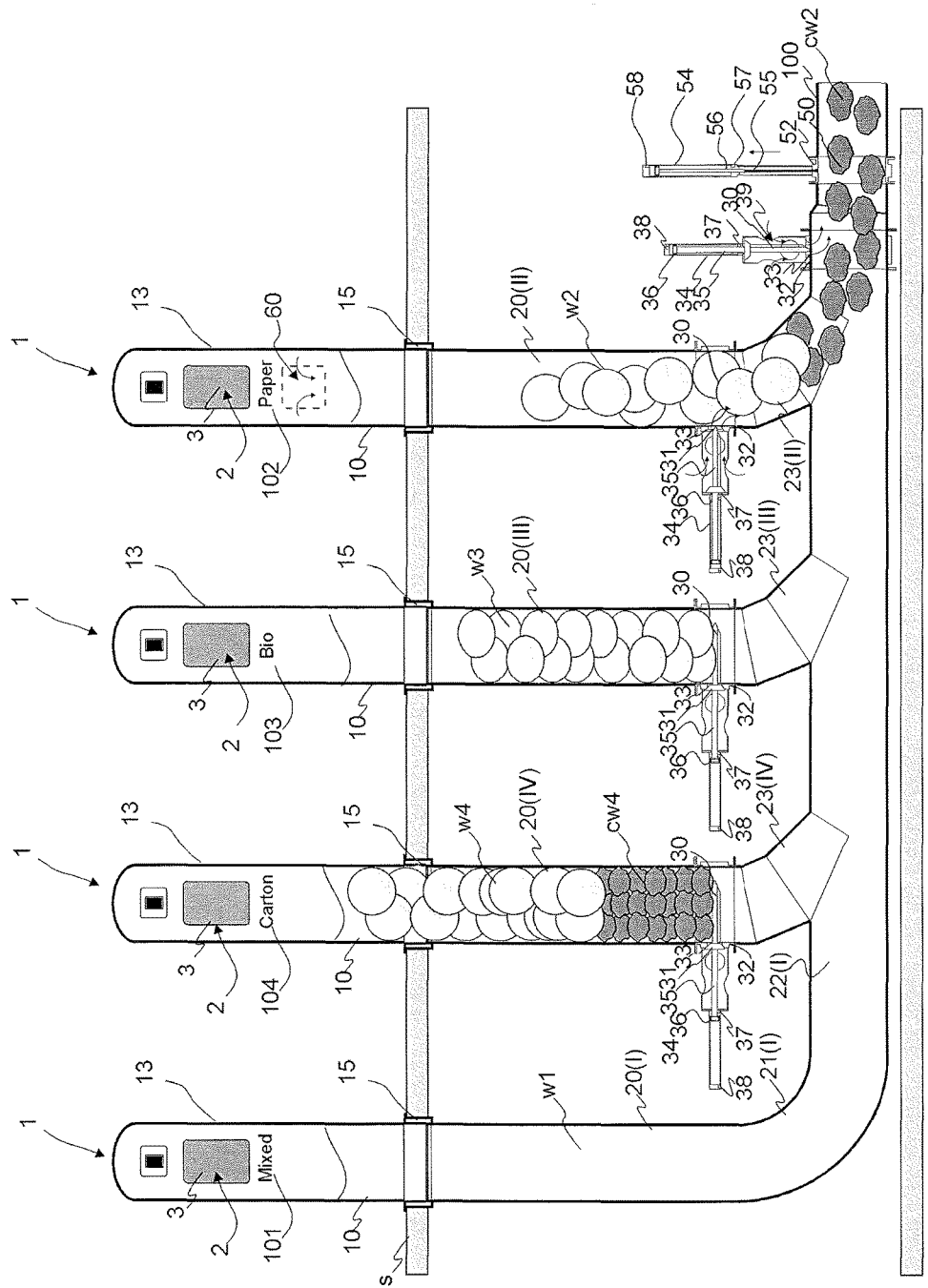
FIG. 6 presents a simplified and partially sectioned embodiment of an apparatus according to the invention, in a sixth operating state.

FIG. 6 presents the emptying of the second input point 102. After the material w1, cw1 of the first input point has displaced into the conveying pipe 100, the impeding means 30 in the channel space of the intermediate container 20(II) of the second input point 102 is displaced into the position in which it does not essentially extend into the channel space. In this case the material cw2, w2 in the intermediate container starts to displace towards the conveying pipe 100 via the channel space 22(I) of the first intermediate container. The replacement air valve 60 of the second intermediate container is opened and the replacement air duct 60 of the first intermediate container is closed. Replacement air is also brought into the medium channel 22(II) from the replacement air inlet aperture 33 formed in the impeding means 30. By means of the second material category w2, cw2 to be emptied, which in the embodiment of the figure is paper, the conveying pipe can, in part, be cleaned of the traces of the preceding material category w1, cw1, which was mixed waste.

Figure 7:
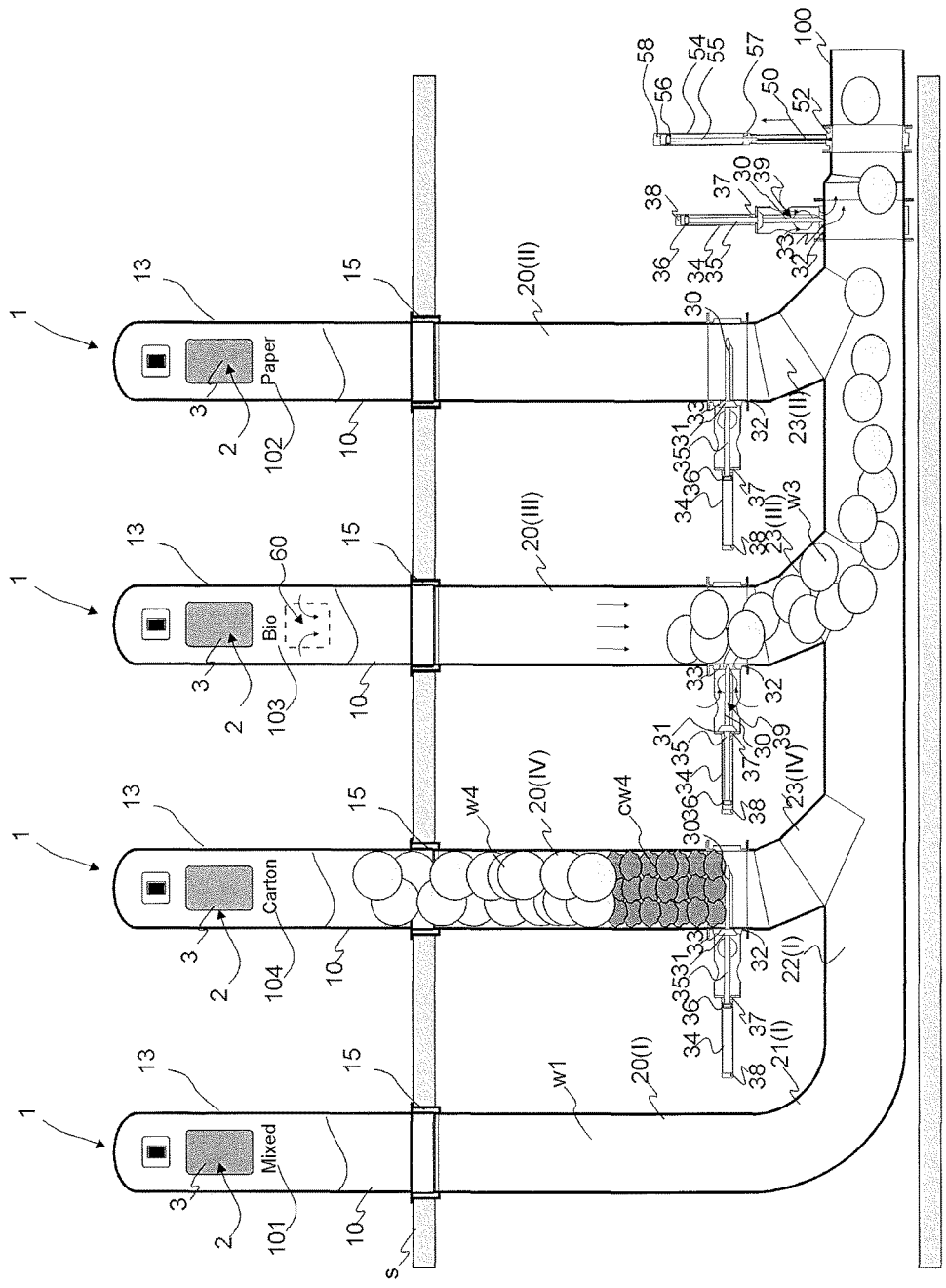
FIG. 7 presents a simplified and partially sectioned embodiment of an apparatus according to the invention, in a seventh operating state.

FIG. 7 presents the emptying of the next category of material. The material of the third input point 103 does not compact in this embodiment, because it is a type that is poorly compactable. For example, biodegradable waste can be this type of material. The emptying of the intermediate container 20(III) of the third input point 103 is performed correspondingly to the emptying of the intermediate container of the second input point. The impeding means 30 is displaced out of the channel space of the intermediate container. The replacement air duct 60 in the input point 103 is opened, in which case the material 3 displaces towards the conveying pipe 100 via the channel part 22(I) of the intermediate container of the first input point. Replacement air is also brought into the medium channel 22(III) from the replacement air inlet aperture 33 formed in the impeding means 30. In this case the replacement air duct 60 in the second input point 102 is closed.

Figure 8:
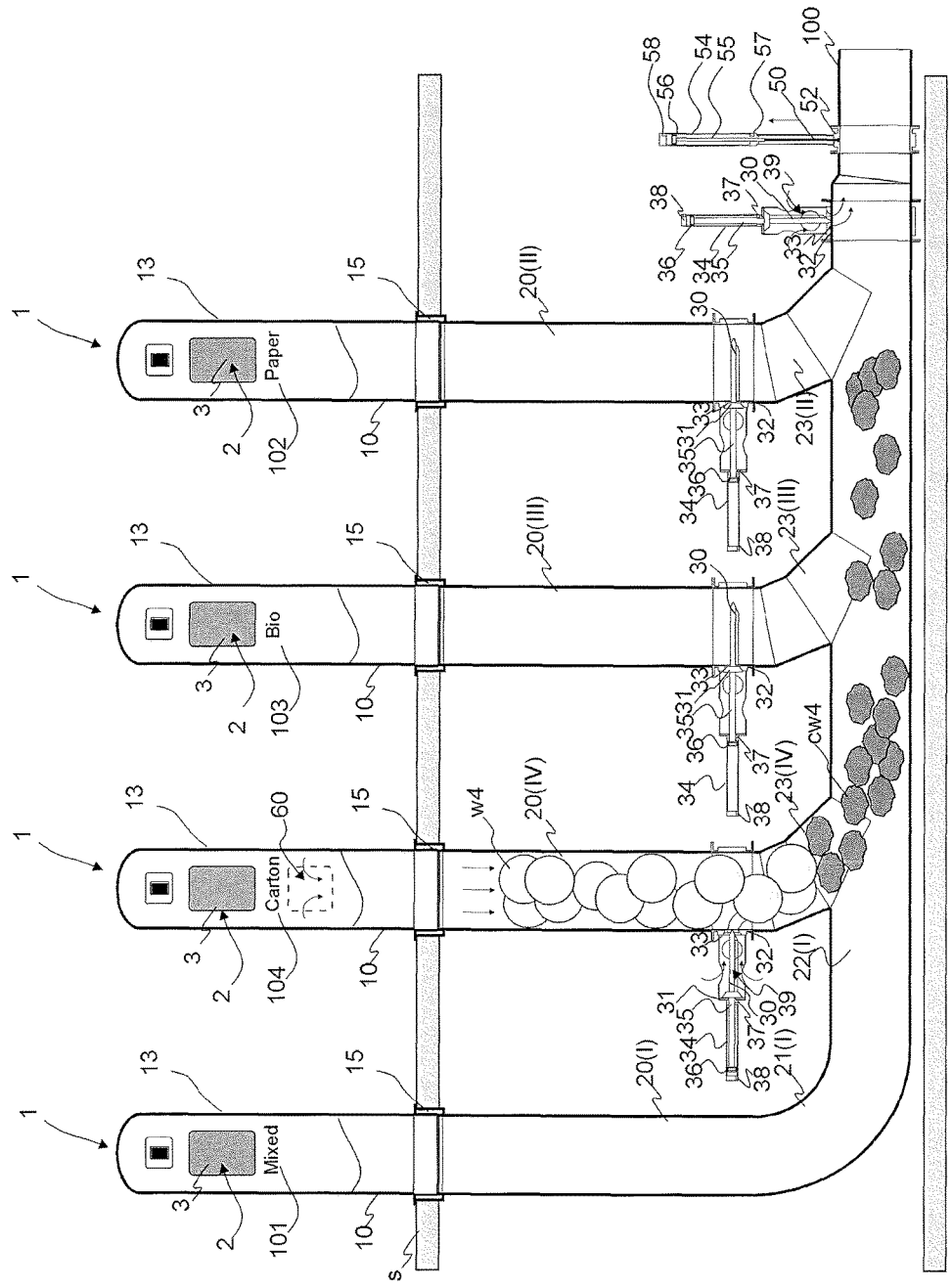
FIG. 8 presents a simplified and partially sectioned embodiment of an apparatus according to the invention, in an eighth operating state.

FIG. 8 presents the emptying of the fourth input point 104, in which case the impeding means 30 extending into the channel space of the fourth intermediate container 22(IV) is displaced into the position in which the impeding means does not essentially extend into the channel space. The replacement air duct 60 in the input point 103 is opened, in which case the material 3 displaces towards the conveying pipe 100 via the channel part 22(I) of the intermediate container of the first input point. Replacement air is brought into the medium channel 22(IV) from the replacement air inlet aperture 33 formed in the impeding means 30. By means of the fourth material category w4, cw4 to be emptied, which in the embodiment of the figure is paperboard, the conveying pipe can, in part, be cleaned of the traces of the preceding material category w3, cw3, which was biodegradable waste.

When the emptying sequence has been completed, there can be a return to the situation of FIG. 1 and again the intermediate containers of the input points 101, 102, 103, 104 can start to be filled.

Figure 9:
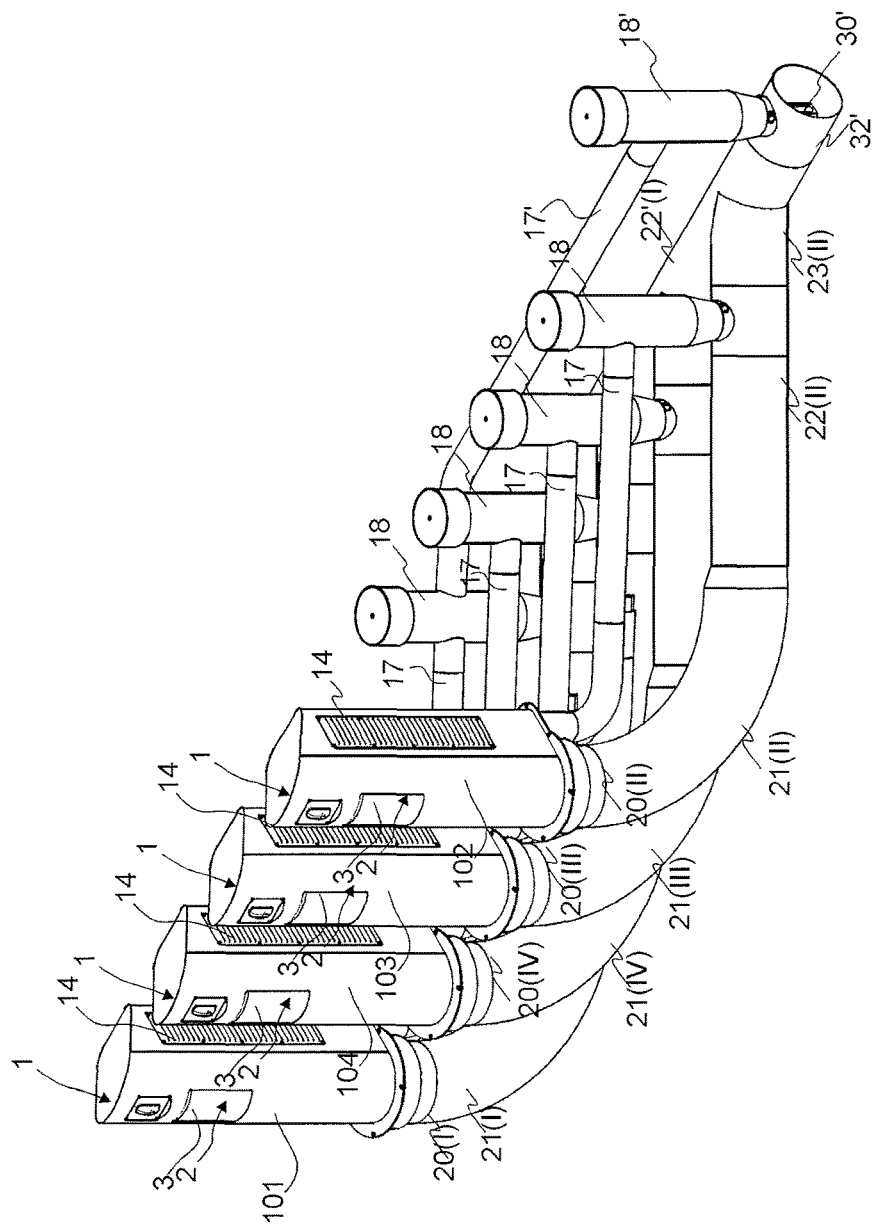
FIG. 9 presents an apparatus of the invention from a first direction

FIG. 9 presents a second embodiment of an apparatus according to the invention. In it the channel parts of the intermediate containers of also the second input point 102, third input point 103 and fourth input point 104, in addition to the channel parts 20(I), 21(I), 22(I) of the intermediate container of the first input point 101, are arranged mainly in a direction deviating from the vertical, at first they can have a short vertical part 20(II), 20(III), 20(IV), then a curved section 21(II), 21(III), 22(IV) and a horizontal section 22(II), 22(III), 22(IV). With this arrangement the height of the underground space needed by the intermediate containers can be essentially reduced. The figure also presents the installation space 18, i.e. an installation trench, intended for the impeding means and for their drive means. The figure further presents the channel part 17 extending into the installation trench 18 of the impeding means for conducting replacement air from the inside of an input point into the installation trench 18 and via the aperture 33, when permitted by the valve means of the impeding means, into the channel space of the intermediate container of the input point in question.

Figure 10:
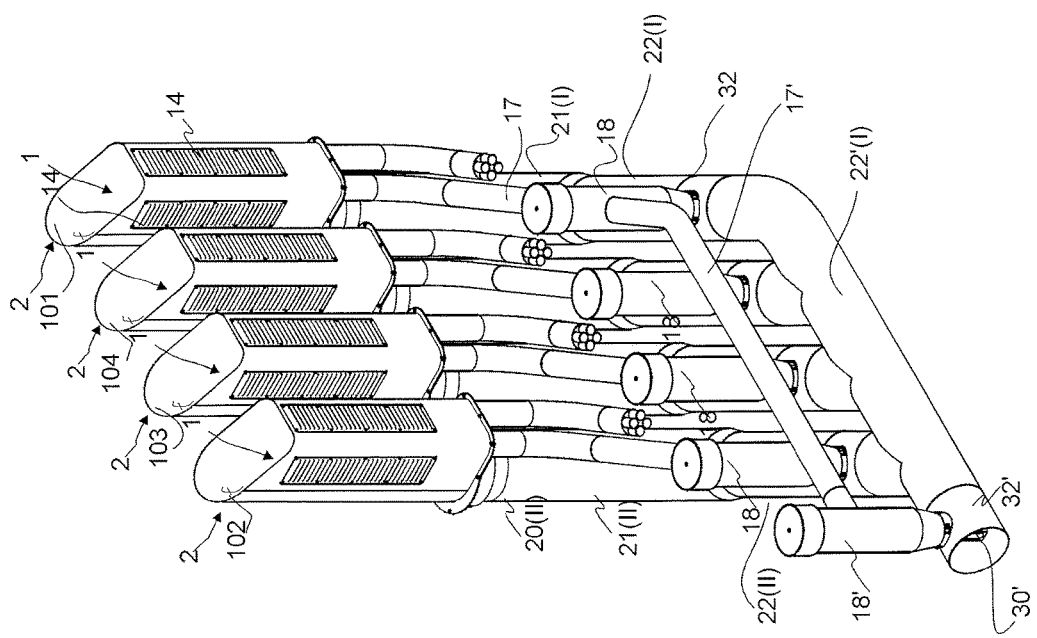
FIG. 10 presents an apparatus of the invention from a second direction.
Figure 11:
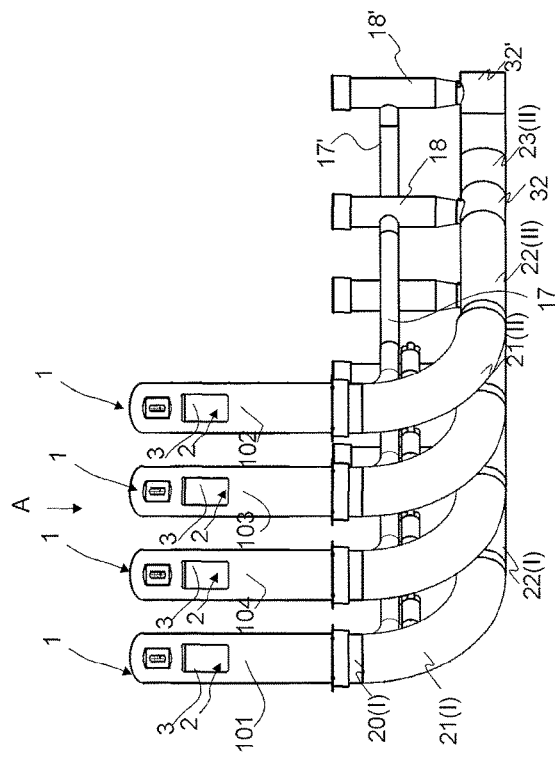
FIG. 11 presents an apparatus of the invention, from the direction B of FIG. 12.
Figure 12:
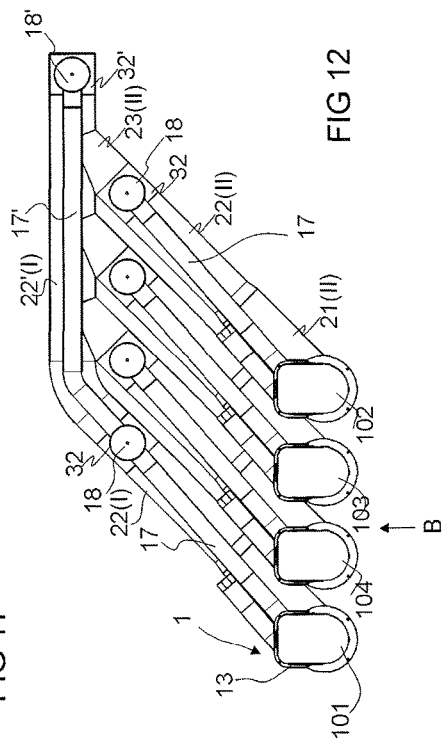
FIG. 12 presents an apparatus of the invention, from the direction A of FIG. 11.

In the embodiment of FIGS. 9-12 two impeding means 30, 30' are arranged at a distance from each other in the intermediate container channeling 20(I), 21(I), 22(I) of the first input point. This enables e.g. a number of compacting phases, in which case more material is made to fit efficiently into the intermediate container. In FIGS. 9 and 10 the first impeding means 30 of the first input point is arranged in the first installation trench. Replacement air is conducted into the installation trench by the first replacement air duct 17. The second impeding means 30' is arranged in the channel part 22(I) closer in the material conveying direction to the actual material conveying pipe 100 (not presented in FIGS. 9 and 10).

The apparatus thus comprises means for conducting replacement air into the channel section of the intermediate container. An input aperture 2 is formed in the enclosure 13 of an input point 1, which enclosure forms the outer walls of the input point, for feeding material into the feed-in container of the input point, as well as apertures 14 (FIG. 9) for conducting replacement air to inside the enclosure. The replacement air passes to inside the enclosure 13 through the grating-type apertures 14 and onwards via the replacement air valve 60 into the container 10.

Figure 15:
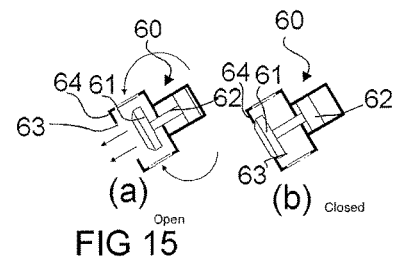
FIG. 15 presents the replacement air valve of an embodiment of the invention, in two operating states, (a) replacement air pathway open and (b) replacement air pathway closed.
Figure 14:
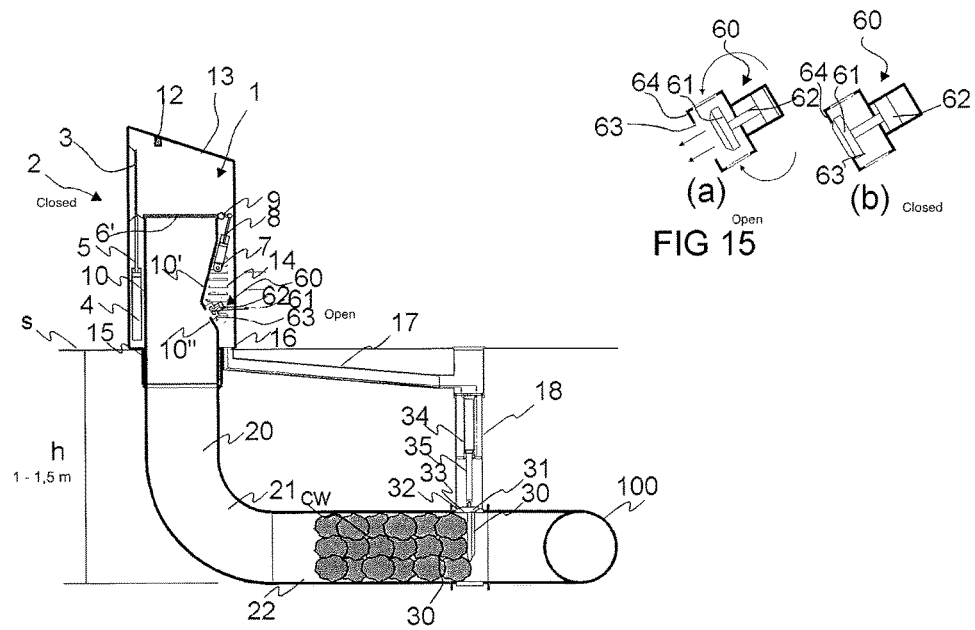
FIG. 14 presents a pari of an apparatus of the invention, when sectioned.

FIG. 9 presents the apertures 14 formed in the enclosure 13 of an input point for conducting replacement air to inside the enclosure 13. Most of the replacement air is conducted via the feed-in container 10 into the channel space of the intermediate container 20, 21, 22 and onwards into the conveying pipe 100, when the suction of a partial-vacuum generator of the pneumatic conveying system for wastes is able to act from the conveying pipe 100 into the feed-in container. According to an embodiment of the invention at least one other replacement air duct 16, 17 is arranged into the channel section 22 of the intermediate container, into the vicinity of the impeding means 30, which replacement air duct in the embodiment of FIG. 9 is arranged from an input point 1, such as via the aperture 16 (presented e.g. in FIG. 14 or 16a-16g), from inside its enclosure 13. A valve means 31 is arranged in the impeding means 30, which valve means opens a medium connection from the second replacement air duct 17 into the channel section 22 of the intermediate container. This is also presented in FIG. 14, which also presents an inside view of an embodiment of an input point. With respect to the present application, FIG. 14 shows one embodiment of a replacement air duct and a replacement air valve 60 in the wall 10' of the feed-in container 10 of an input point. The shape and operation of the input points can vary according to the application site. In it, arranged in the input point 1, is a separate replacement air valve 60, which has at least two positions, a closed position, in which case the shut-off means 61 of the valve closes the channel part, which in FIGS. 14 and 15 is the pathway 63 for replacement air arranged in the wall of the feed-in container 10, and a second position in which the pathway 63 for replacement air is open. The shut-off means of the valve is driven with a drive device 62. A separate replacement air valve 60 according to one embodiment of the invention is presented in more detail in FIG. 15 in two operating states, in FIG. 15 (a) replacement air pathway open and in FIG. 15 (b) replacement air pathway 63 closed. The separate replacement air valve has a drive device 62, which is arranged to move the shut-off means 61 between the aforementioned at least two positions. Apertures are arranged in the body 64 of the replacement air valve 60, from which apertures replacement air passes to the point of the pathway 63 that is openable and closable with the shut-off means 61 of the valve. The drive device can be e.g. a medium-driven cylinder-piston unit or e.g. an electrically-operated drive device.

The second pathway 17 for replacement air is arranged to conduct replacement air into connection with the impeding means 30. According to FIG. 14, the second pathway 17 for replacement air is arranged to start after the input point 1 from the top part of the material pathway, e.g. after the coupling part 15, and extends into the installation depth 18. From the installation depth 18 the replacement air passes via the replacement air pathway and apertures 39 (FIG. 5) into the vicinity of the impeding means 30 when the impeding means has been displaced into the second position and its valve means 31 has been opened to open the pathway via the aperture 33 into the channel part 22. An actuator is arranged to drive the impeding means, which actuator can be the cylinder-piston combination presented in FIGS. 1-8, in which a valve means and an impeding means 33 are arranged on the piston rod 35 of the piston 36 arranged movably in the cylinder 34. The cylinder is driven by a pressure medium being conducted e.g. via the apertures 37 and 38. The medium ducting and medium piping are not presented. The actuator can also be some other type of actuator, e.g. an electrically-operated actuator.

The apparatus comprises at least two input points 1, a channel section 20, 21, 21 functioning as an intermediate container, into which waste material is arranged to be conveyed from an input point 1, and also means for conveying the waste material from an input point into the intermediate container, where the material is compressed to be smaller in volume. From the channel section functioning as an intermediate container the waste material is conveyed onwards in the conveying piping 100 of the pneumatic waste material conveying system. In the conveying piping 100 the waste material displaces together with the transporting air to a reception point, such as a waste station, of the system, in which the waste material being transported is separated in separating means from the transporting air and conveyed for further processing or into a shipping container. The operation of a pneumatic wastes conveying system is not described in more detail here. Various examples of pneumatic wastes transporting systems are presented generally, e.g. in publications WO 2009/080880, WO 2009/080881, WO 2009/080882, WO 2009/080883, WO 2009/080884, WO 2009/080885, WO 2009/080886, WO 2009/080887, WO 2009/080888, and WO/2011/110740.

When the impediment 30 arranged in the channel section of the intermediate container is in the channel section of the intermediate container, it essentially prevents the displacement of waste material past the impediment 30 towards the conveying pipe 100. In this case the waste material w compacts, i.e. compresses together and against the impediment 30, from the combined effect of the suction and replacement air flow. As a result of the compression, the volume of the waste material in the intermediate container decreases significantly, depending on the embodiment and on the properties of the waste material. In one case the volume of the compacted waste material cw has been reduced by 30-50% compared to the volume before compacting. When the waste material has been compacted, more waste material w can be fed into the intermediate container, following after the compacted waste material cw in the conveying direction of the material. In this case the suction typically does not act in the intermediate container from the direction of the conveying pipe, but instead the waste material is fed into the intermediate container from the feed-in container mainly from the effect of gravity. In the embodiment of the figure also the impeding means 30 is in the first position and keeps the material from displacing into the conveying pipe 100.

When the suction of the partial-vacuum generator of the pneumatic pipe conveying system is switched on for emptying the other containers of the system, the valve 6 is arranged into the closed position, in which case replacement air does not get into the intermediate container from the input point of FIG. 7e nor onwards via it into the conveying pipe 100. In this case the material that is in the intermediate container of the figure stays there and does not displace into the conveying pipe 100. In this case also the impeding means 30 is in the first position. When the valve 6 is in the closed position, still more waste material can be fed in via the input aperture 2 into the feed-in container 10 of an input point. The amount to be fed in depends on the volume of the feed-in container of the input point. In the figures the uncompressed waste material w is described as simplified balls, each which can present a wastebag packed with waste. The compressed waste material cw is described in the figures as objects smaller than the balls.

As presented in the embodiment of the invention according to the figures, a horizontal channel section 22 is arranged in the intermediate container. In this case material that has been conveyed by gravity to the starting end of the intermediate container, i.e. into the vertical channel section 20, and into the curving channel section 21 following it, is conveyed in the horizontal section, by arranging a negative pressure effect in the intermediate container from the direction of the conveying pipe and, correspondingly, replacement air from the direction of the input point, in which case the waste material is conveyed in the horizontal part under the combined effect of these towards the impeding means 30 and/or towards the conveying pipe 100.

The horizontal channel section provides the apparatus according to the invention with the advantage, among others, that the size of the intermediate container can easily be significantly increased compared to an earlier vertical intermediate container, e.g. by arranging the location in which the impeding means is situated at the desired distance in the material conveying direction from the input aperture or feed-in container of the input point.

Figure 13:
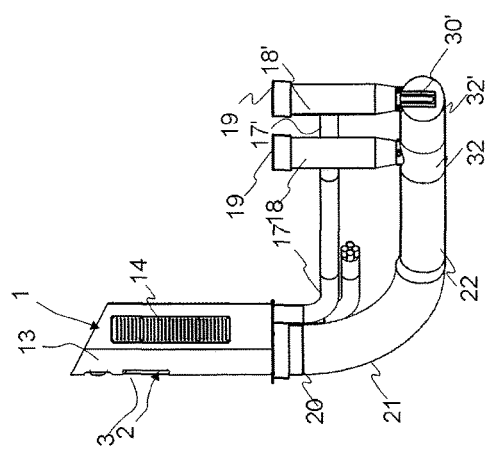
FIG. 13 presents a part of an apparatus of the invention.

According to one embodiment of the invention a number of impeding means can be arranged in the channel section of an intermediate container. FIG. 13 presents for the sake of clarity just one input point 1, in which are channel sections 20, 21, 22 that can be utilized as an intermediate container. Two impeding means 30, 30' are arranged in the channel section 22, which are arranged at a distance from each other in the conveying direction of the material in the channel space 22 of the intermediate container of the first input point. There can be more impeding means 30, 30' than this if the length of the intermediate container and/or the properties of the waste category so require. According to an embodiment of the invention at least one second replacement air duct 16, 17, 17' is arranged into the channel section 22 of the intermediate container, into the vicinity of the first impeding means 30, which replacement air duct in the embodiment of FIG. 13 is arranged from an input point 13, such as via the aperture 16, from inside its enclosure 13. A replacement air duct section 17' is arranged between the installation depth 18 of the first impeding means 30 and the installation depth 18' of the second impeding means 30'. The impeding means is arranged in an installation depth 18, 18' in such a way that a medium connection can be formed from the replacement air duct 17, 17' into the channel section of the intermediate container, into the vicinity of the impeding means. In the embodiment of the figures each impeding means 30, 30' is arranged in the channel section of an intermediate container with a pipe section 32, 32', which is fixed to the channel section 22, 22' with a joint arrangement required by the application site. The operating principle of the impeding means of FIG. 13 is presented hereinafter in connection with FIGS. 16a-16g.

FIGS. 16a-16g present an embodiment of the invention comprising two impeding means 30, 30', which are arranged at a distance from each other in the conveying direction of the material in the channel space 22 of the intermediate container of the first input point. There can be more impeding means 30, 30' than this if the length of the intermediate container and/or the properties of the waste category so require. According to an embodiment of the invention at least one second replacement air duct 16, 17, 17' is arranged into the channel section 22 of the intermediate container, into the vicinity of the first impeding means 30, which replacement air duct in the embodiment of FIGS. 16a-16g is arranged from an input point 1, such as via the aperture 16, from inside its enclosure 13. A replacement air duct section 17' is arranged between the installation depth 18 of the first impeding means 30 and the installation depth 18' of the second impeding means 30'. The impeding means is arranged in an installation depth 18, 18' in such a way that a medium connection can be formed from the replacement air duct 17, 17' into the channel section of the intermediate container, into the vicinity of the impeding means. In the embodiment of the figures each impeding means 30, 30' is arranged in the channel section of an intermediate container with a pipe section 32, 32', which is fixed to the channel section 22, 22' with a joint arrangement required by the application site.

A valve means 31, 31' is arranged in the impeding means 30, 30', which opens a medium connection from the second replacement air duct 17, 17' into the channel section 22, 22' of the intermediate container. In the following the operation of the apparatus is explained with reference to FIGS. 16a-18g, when a number, in the figures two, impeding means 30, 30', have been arranged in the channel section 22' (in the figure, only the marking 22 is used) of the intermediate container of the first input point at a distance from each other in the conveying direction of the material in the channel section between the input point 1 and the conveying pipe 100.

Figure 16A:
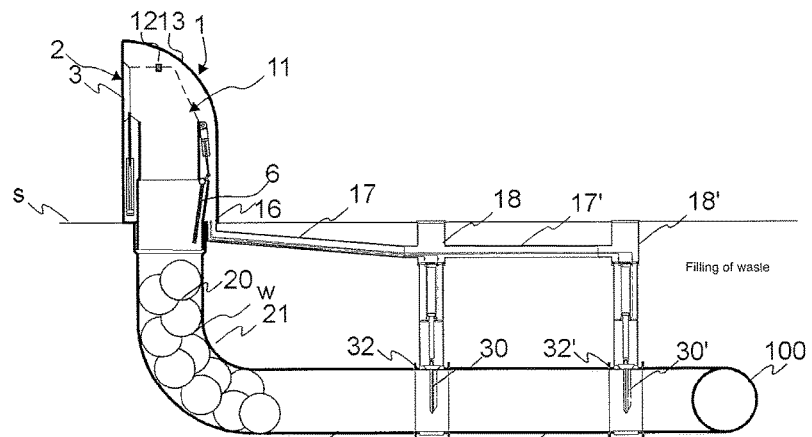

FIG. 16a presents an operating state, in which the waste material w intended for transporting and for handling in the apparatus according to the invention has been fed in from the input aperture 2 of an input point 1. In FIG. 16a the waste material w fed in from the feed-in container 10 has already been displaced into the intermediate container, into the channel section 20, 21, mainly by means of gravity. In the operating state of FIG. 16a the contents of the feed-in container have been emptied into the channel section 20 of the intermediate container.

Figure 16B:
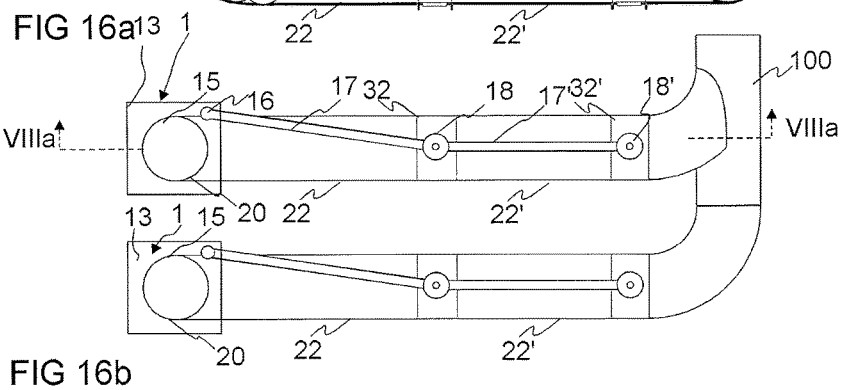

According to FIG. 16b, which presents a diagrammatic and simplified view of the apparatus sectioned along the lines, two input points 1 are arranged side-by-side. These can be intended for e.g. different categories of waste or e.g. to increase capacity.

FIG. 16c presents an operating state in which the suction of a partial-vacuum generator of the pneumatic pipe transport system for wastes is able to act from the conveying pipe 100 into the channel section of the intermediate container, in which case the waste material w that has displaced into the intermediate container from an input point 1 (101) displaces in the intermediate container 20, 21, 22 towards the conveying pipe 100. The waste material is able to displace towards the first impeding means 30, which is in the channel section of the intermediate container, and essentially prevents the displacement of waste material w past the impediment 30 towards the conveying pipe 100. In this case the waste material w compacts, i.e. compresses together and against the impediment 30, from the combined effect of the suction and replacement air flow. As a result of the compression, the volume of the waste material in the intermediate container decreases significantly, depending on the embodiment and on the properties of the waste material. In one case the volume of the compacted waste material cw1 has been reduced by 30-50% compared to the volume before compacting. In the situation of FIG. 16c the compacted waste material cw1 is in volume approx. 50% of the volume of the waste material w before compacting.

FIG. 16d presents an operating state, in which the first impeding means 30 is in the first position, in which it extends into the channel part of the intermediate container. In this case more material w to be handled can be fed into the intermediate container, following after the material cw compacted in the preceding phase.

When the waste material has been compacted against the first impeding means, more waste material w can be fed into the intermediate container, following after the compacted waste material cw in the conveying direction of the material. This is presented in FIG. 16d. In this case the suction typically does not act in the intermediate container from the direction of the conveying pipe, but instead the waste material is fed into the intermediate container from the feed-in container mainly from the effect of gravity. In the embodiment of the figure also the impeding means 30, 30' are in the first position and keep the material from displacing into the conveying pipe 100.

FIG. 16e presents a situation in which the first impeding means has been displaced into the second position, i.e. the position in which it does not extend into the channel space 22. When the suction is connected to act from the material conveying pipe in the channel space and replacement air is able to act from the direction of a material input point, material displaces towards the conveying pipe against the second impeding means 30' and is further compacted. Replacement air has possibly also come from the replacement air duct 33 arranged in connection with the first impeding means possibly enhancing compaction efficiency. A considerable amount of the compacted material has now been made to fit into the channel section functioning as the intermediate container of an input point.

Next, according to FIG. 16f, more material w can be fed in from the input point 1 into the channel section functioning as the intermediate container to follow after the previously compacted materials cw. When a sufficient amount of material has been fed in from an input point, or when it is otherwise desired to empty the intermediate container into the conveying pipe, the second impeding means 30' is displaced into the second position, in which no longer extends into the channel section, suction is switched on to act from the conveying pipe into the channel section 22, and the replacement air pathway from the direction of the input point into the channel 20, 21, 22 is opened. At the same time replacement air is conducted from the replacement air pathway 33, 33' arranged in connection with the impeding means into the channel section functioning as an intermediate container. The material displaces from the channel section into the conveying pipe.

In the operating state of FIG. 16g it is desired to convey the waste material w, cw that has collected in the feed-in container and/or intermediate container 20, 21, 22 of an input point 1 in the system into the conveying pipe 100, in which case the valve 6 is opened and the impeding means 30, 30' are displaced out of the channel space of the intermediate container. In this case the waste material displaces from the combined effect of suction and a replacement air flow from the intermediate container 10 towards the conveying pipe 100 along with the transporting air flow and along the conveying pipe towards the delivery end of the pneumatic wastes conveying system. At least one impeding means 30, 30' is arranged in the intermediate container 20, 21, 22, 22', 20(I) . . . 22(IV) before the conveying pipe. In the embodiment of the figures the impeding means is a member extending into the channel space of the intermediate container, which member is adapted to receive at least a part of the force effect of the material w when the material is conveyed in the channel space of the intermediate container by means of suction and a replacement air flow against the impeding means 30. The impeding means is adapted to let an air flow past or through.

By arranging the inlet aperture 33 of the replacement air duct in the channel in the vicinity of the impeding means, the displacement efficiency of material from the point of the impeding means towards the conveying pipe 100 can be boosted, when the impeding means is arranged into the second position out of the channel space and suction from the conveying pipe side is switched on. At the same time replacement air also enters the channel space via the aperture 33.

According to one embodiment of the invention a shaper of material, typically a rotary shaper, i.e. a formatter, is applied as an impeding means. In this case waste can be pre-compressed by opening the valve of the material conveying piping in a situation in which the handling means of the rotary shaper are not rotating. Waste material does not in this case travel to any significant extent through the rotary shaper from the intermediate container side to the conveying piping 100 side, but instead the material is significantly compressed in size, in which case the volume of the material decreases e.g. by 30-70%. Possible material that has traveled through the rotary shaper in the precompression phase can be conducted e.g. into the body of mixed waste in the material delivery end of the conveying system. Rotary shapers and the operation of them are presented in more detail in publications WO/2011/098666, WO/2011/098667, WO/2011/098668 and WO/2011/098669.

An input aperture 2 is formed in the enclosure 13 of an input point 1, which enclosure forms the outer walls of the input point, for feeding material into the feed-in container of the input point, as well as apertures 14 for conducting replacement air to inside the enclosure. The replacement air passes to inside the enclosure though grating-type apertures 14 and circulates, in some embodiments of input points, via the top into the container 10, as presented in FIG. 16c.

In this case the discharge valve 50 is opened for a while for compressing against the impeding means 30 the material that has been conveyed into the intermediate container by gravity. Typically the discharge valve is opened, depending on the application site, for e.g. 5-10 seconds.

The input point of FIG. 14 has an enclosure 13 and a first input aperture 2 arranged in it. An openable and closable hatch 3, which is driven with a drive device 4, 5 is arranged in connection with the first input aperture. A second shut-off means 6', and its drive means 7, 8, is arranged inside the enclosure. The second shut-off means 6' is arranged in the top part of the feed-in container in a manner allowing turning from a hinged point 9. The second shut-off means 6' has at least two positions; a first position in which it closes the pathway into the feed-in container 10, and a second position in which the pathway into the feed-in container is open. So that the material intended for conveying can be fed into the feed-in container 10 of an input point 1 according to the embodiment of the figure, both the hatch 3 and the second shut-off means 6' must be in the open positions.

The input point of FIG. 14 has a feed-in container 10, in the channel of which is an inwardly contracting point 10', the purpose of which is to taper the material channel of the feed-in container so that, inter alia, the infeeding of overlarge objects into the feed-in container of the input point is prevented. In the embodiment of the figure a separate replacement air valve 60 is arranged in the wall of the feed-in container 10 on the same side as the contracting point 10', and arranged after the contracting point in the material infeed direction is an outwardly expanding channel in the wall section 10" from the narrowest point of the feed-in container.

A separate replacement air valve 60 is adapted to be used more particularly in connection with the compacting, in which case the replacement air pathway 63 into the feed-in container and onwards into the channel parts of the intermediate container is opened with the shut-off means 61 driven by the drive device 62 of the replacement air valve. In this case replacement air is able to travel through the apertures 14 of the enclosure 13 of the input point and onwards into the material conveying channel via the pathway 63 opened by replacement air valve arranged inside the enclosure, into the channel parts 20, 21, 22 that function as an intermediate container. The suction of the partial-vacuum generator of the pneumatic material conveying system acts from the conveying pipe 100, in which case the material in the intermediate container is compressed in size by means of the impediment 30 or against it. The material can, depending on its type, be compressed in size e.g. by 30-50% from its original volume. The replacement air valve is kept in the open position for the time required for compression, which can vary according to the application site. A rather short time for the valve to be open, e.g. 2-10 seconds, preferably 2-5 seconds, can be sufficient for the compression. The size of the replacement air valve can be significantly smaller than the cross-sectional area of the shut-off valve or of the channel section to be used in conveying material. In this case one advantage, among others, achieved is that the material compacts, i.e. compresses in size, optimally and e.g. not too tightly into the channel part or into itself in the channel part. The small size of the replacement air valve also makes it possible for a large plurality of intermediate containers to be compacted simultaneously, in which case savings in time and energy are achieved. According to one embodiment the materials fed into the channel sections 20 of an intermediate container are compacted simultaneously. Likewise, the compacting of material that has collected in the channel sections of the intermediate containers can be done partly in conjunction with other conveying suction.

In tests according to one embodiment a suction aperture of 80 mm diameter for replacement air was used in a pipe of 350 mm diameter, which proved to be suitable. In this case it was possible to compress mixed waste by 50% in a few seconds.

A small replacement air valve 60 can also be used as a pilot valve in the conveying of material, in which case first the separate replacement air valve 60 is opened and only then the larger shut-off valve 6, 6', 50, in which case a pressure shock and a possible noise problem are avoided.

With the replacement air valve 60 of an input point the starting of the movement of material can be regulated, in which case when suction acts from the conveying pipe 100 side, by opening and closing the replacement air valve 60 of the input points the starting of the movement of the material of each feed-in container can be affected. Even though suction is acting from the conveying pipe 100 side, the material hardly displaces at all in the intermediate container, especially when the impediment 30 is in the first position, unless the replacement air valve of the input point has been opened.

The invention thus relates to a method for feeding in and for handling waste material in the channel section of a pneumatic wastes conveying system, in which method waste material or recycleable material is fed into a feed-in container 10 from the input aperture 2 of at least two input points 1 of a pneumatic pipe transport system for material and onwards into the channel section 20, 21, 22 between the feed-in container and the material conveying pipe 100, from where the material is conveyed along with the transporting air via the material conveying pipe 100 to the delivery end of the pneumatic material conveying system, where the material is separated from the transporting air. In the method the channel section 20(II), 20(III), 20(IV) . . . 22(II), 22(III), 22(IV) of at least one second input point is connected to the channel section 20(I), 21(I), 22(I) of one first input point between the input point 1 and the impeding means 30, 30', that in the method at least a part of the material w, w1, w2, w3, w4 fed in is acted upon by the combined effect of suction and replacement air in the channel section 20(I), 21(I), 22(I) . . . 20(IV), 21 (IV), 22(IV) by bringing about compression in size in at least a part of the material w, w1, w2, w3, w4 being conveyed, by means of an impediment 30 arranged between the conveying pipe 100 and the material w, w1, w2, w3, w4 to be handled, or against the impediment, before transportation of the material to the delivery end of the pneumatic transport system for wastes.

According to one embodiment in the method at least a part of the material w1, w2, w3, w4 that has been fed into a channel section 20(I), 21(I), 22(I) . . . 20(IV), 21 (IV), 22(IV) intended to function as an intermediate container is acted upon, if necessary, by opening a pathway from the direction of the conveying pipe 100 into the channel section 20(I), 21(I), 22(I) . . . 20(IV), 21 (IV), 22(IV) intended to function as an intermediate container to the suction side of the pneumatic partial-vacuum generator, and by opening a pathway from the opposite side of the material w1, w2, w3, w4 for the replacement air pathway.

According to one embodiment the material w1, w2, w3, w4 is acted upon in the channel section 20(I), 21(I), 22(I) . . . 20(IV), 21 (IV), 22(IV) of the intermediate container arranged between an input point 1 and the material conveying pipe 100, from which the channel section 20(I), 21(I), 22(I) of at least one first input point is at least partly arranged in a direction traveling in a direction essentially deviating from the vertical direction, preferably to travel in an essentially horizontal direction. According to one embodiment material w1, w2, w3, w4 is fed in from each input point 1, 101, 102, 103, 104 into a channel section 20(I), 21(I), 22(I) . . . 20(IV), 21(IV), 22(IV), which channel section is an intermediate container of material to be fed in from an input point, and the material is acted upon in the intermediate container in stages, in which case in the first phase material is fed from an input aperture 2 of an input point 1 into the channel section 20(I), 21(I), 22(1) . . . 20(IV), 21 (IV), 22(IV) functioning as an intermediate container mainly by means of gravity, in the second phase material is conveyed in the channel section against an impediment 30, 30' and is compressed by the combined effect of suction and replacement air, in the third phase possibly more material is fed in from the input aperture of an input point by gravity into the channel part functioning as an intermediate container, and in the fourth phase the impediment is acted upon in such a way that the material w, w1, w2, w3, w4 that is in the intermediate container and/or the compressed material cw, cw1, cw2, cw3, cw4 is conveyed by the combined effect of suction and replacement air from the channel section 20(I), 21(I), 22(I) . . . 20(IV), 21 (IV), 22(IV) into the conveying piping 100, and onwards towards the material delivery end of the pneumatic material conveying system.

According to one embodiment when compressing material w, w1, w2, w3, w4 and/or in the material conveying phase the entry of replacement air is allowed, e.g. by opening the valve 6 or a separate replacement air valve 60 for a certain time. According to one embodiment at least when compressing the material and/or at least in the starting phase of the material conveying phase the pathway 63 of the replacement air is opened, the flow aperture of which pathway is smaller than the flow cross-sectional area of the channel part from which the suction of the partial-vacuum generator of the pneumatic material conveying system acts.

According to one embodiment between an input point 1 and the material conveying pipe 100 are a number of impediments 30, 30' that are at a distance from each other in the material conveying direction, in which case at first the material is fed to the first impediment 30 that is closer to the input point and compression of the material is brought about by means of the first impediment, or against said impediment, and after that the first impediment 30 that is nearer the input point is placed into the position, in which it does not extend into the channel section of the intermediate container and conveying of the material to the second impediment 30' is brought about and compression of the material is brought about by means of the second impediment 30' that is farther from the input point 1, or against said impediment.

According to one embodiment replacement air is brought into the vicinity of the impediment 30, 30' when material is conveyed from the point of the impediment towards the conveying pipe.

According to one embodiment the material w1 . . . w4 is compressed in size by 30-70% from its original volume.

According to one embodiment a replacement air valve 31 is arranged in connection with an impediment 30, 30', which valve allows the entry of replacement air into the channel part, at least when the impediment 30, 30' is arranged into a position in which material is conveyed towards the conveying pipe 100.

According to one embodiment the channel section 20, 21, 22 functioning as an intermediate container is installed to a depth that is approx. 1-2.5 meters from the surfaces of the ground.

According to one embodiment there are a number of input points, in which case in the first phase material w is fed from a first and/or at least from one other input point into the channel section 20(I), 21(I), 22(I) . . . 20(IV), 21 (IV), 22(IV) of each input point, which channel section is an intermediate container of material, mainly by means of gravity, and the material is acted upon in the intermediate container in stages, in the second phase material is conveyed in the channel section against an impediment 30, 30' and is compressed by the combined effect of suction and replacement air, in the third phase possibly more material is fed in from the input aperture of an input point by gravity into the channel part functioning as an intermediate container, and in the fourth phase the impediment is acted upon in such a way that the material w, w1, w2, w3, w4 that is in the intermediate container and/or the compressed material cw, cw1, cw2, cw3, cw4 is conveyed by the combined effect of suction and replacement air from the channel section 20(I), 21(I), 22(I) . . . 20(IV), 21 (IV), 22(IV) into the conveying piping 100, and onwards towards the material delivery end of the pneumatic material conveying system. According to one embodiment the material is conveyed from the channel part functioning as an intermediate container into the conveying pipe and always every now and then another category of waste is conveyed, which cleans the channel part and/or the conveying pipe after the previously conveyed material.

According to one embodiment when the previous material category to be conveyed is mixed waste w1, the next material category to be conveyed is paper w2, when the previous material category to be conveyed is biodegradable waste w3, the next material category to be conveyed is paperboard w4 or paper w2 or mixed waste w1, when the previous material category to be conveyed is paperboard w4, the next material category to be conveyed is mixed waste w1 or paper w2.

According to one embodiment at first the material from the channel section 20(I), 21(I), 22(I) of the first input point, said channel section functioning as an intermediate container, is emptied into the conveying pipe, next it is emptied from the channel section 20(II), 20(III), 20(IV) . . . 22(II), 22(III), 22(IV) of some other input point, or of a number of input points, said channel section functioning as an intermediate container, most suitably consecutively, until the material from the channel sections functioning as an intermediate container has been emptied towards the conveying pipe.

According to one embodiment the impediment is a separate impeding means 30, 30', which can be moved between at least two positions, a first position, in which the impeding means 30, 30' extends into the channel space of the channel section, and a second position, in which the impeding means does not essentially extend into the channel space of the channel section, and through or past which impediment the replacement air flow in the channel space passes, or that the impediment is another means, such as shaper of the material, e.g. a rotary shaper, the handling means of which do not feed material from the channel section 22 towards the conveying pipe 100 when the shaper of the material is used as an impediment.

The invention also relates to an apparatus for feeding in and for handling waste material in the channel section of a pneumatic wastes conveying system, which apparatus comprises at least two input points 1 of a pneumatic pipe transport system for material, each of which input points comprises an input aperture 2 into a feed-in container 10, and onwards into the channel section 20, 21, 22 arranged between the feed-in container and the material conveying pipe 100, which channel section is adapted to function as an intermediate container, from where the material is adapted to be conveyed via a material conveying pipe 100 to the delivery end of the pneumatic wastes conveying system, where the material is separated from the transporting air, which apparatus can be connected to the conveying pipe 100, into which the suction side of a partial-vacuum generator can be connected to act. The apparatus comprises at least one impeding means 30, which can be arranged between an input point 1 and the conveying pipe 100 in the channel section 20(I), 21(I), 22(I) . . . 20(IV), 21 (IV), 22(IV) of each input point, which impediment is adapted to stop at least most of the material and to let an air flow past or through in such a way that in the channel section 20(I), 21(I), 22(I) . . . 20(IV), 21 (IV), 22(IV) compression in size can be achieved, by means of the impediment 30 or against the impediment, by the combined effect of suction and replacement air for at least a part of the material w that is intended for conveying, and that the channel section 20(II), 20(III), 20(IV) . . . 22(II), 22(III), 22(IV) of at least one second input point is connected to the channel section 20(1), 21(I), 22(I) of one first input point between the input point 1 and the impeding means 30, 30'.

According to one embodiment an impeding means 30 is arranged in the channel section 20(II), 20(III), 20(IV) . . . 22(II), 22(III), 22(IV) of at least one second input point between the input point and the channel section 20(I), 21(I), 22(1) of the first input point.

According to one embodiment the channel section 20(I), 21(I), 22(I) of the first input point is adapted in its length in the material conveying direction to be essentially larger than the length in the material conveying direction of the channel section 20(II), 20(III), 20(IV) . . . 22(II), 22(III), 22(IV) of one second input point.

According to one embodiment the apparatus comprises means for opening and closing the connection to the suction side of the pneumatic partial-vacuum generator from the channel section 20, 21, 22 and/or replacement air means 6', 60, for conducting replacement air in a regulated manner into the channel section between an input point and the material w, which means are adapted to open and close a pathway for replacement air.

According to one embodiment the apparatus comprises a channel section 20, 21, 22 arranged between an input point 1 and the material conveying pipe 100, which channel section comprises a channel section deviating from the vertical direction, such as a mainly horizontal channel section, which is adapted to function as an intermediate container.

According to one embodiment the volume of the intermediate container is determined by the distance of the impediment 30 from an input point 1.

According to one embodiment a number of impediments 30, 30' that are a distance from each other in the material conveying direction are arranged between an input point 1 and the material conveying pipe.

According to one embodiment the apparatus comprises means 17, 18, 31, 33 for bringing replacement air into the vicinity of the impediment 30, 30'.

According to one embodiment a replacement air valve 31 is arranged in connection with an impediment 30, 30', which valve when opened allows the entry of replacement air into the channel part from the point of the impediment, or from the vicinity of it.

According to one embodiment the apparatus comprises a discharge valve 6, which is arranged between an input aperture 2 of an input point and the channel section functioning as an intermediate container.

According to one embodiment the apparatus comprises a discharge valve 50, which is arranged between the impediment 30, 30' of the channel section of the first input point and the conveying pipe 100.

According to one embodiment the apparatus comprises a shut-off means 6', which is arranged between the feed-in container 10 of an input point 1 and the input aperture 2 of the input point.

According to one embodiment a replacement air valve 60 is arranged in an input point 1 for opening and closing the pathway 63 of the replacement air into the feed-in container 10 and/or into the channel section 20, 21, 22 functioning as an intermediate container.

According to one embodiment the flow aperture of the pathway 63 for replacement air is smaller than the flow cross-sectional area of the channel part from which the suction of the partial-vacuum generator of the pneumatic material conveying system acts.

According to one embodiment the channel section 20, 21, 22 functioning as an intermediate container is arranged to be installed to a depth that is approx. 1-2.5 meters from the surface s of the ground.

According to one embodiment the impediment is a separate impeding means 30, 30', which can be moved between at least two positions, a first position, in which the impeding means 30, 30' extends into the channel space of the channel section, and a second position, in which the impeding means does not essentially extend into the channel space of the channel section, and through or past which impediment the replacement air flow in the channel space is adapted to travel.

According to one embodiment the impediment is a material handling device, such as shaper of the material, e.g. a rotary shaper, the handling means of which are adapted to be in an operating state wherein they do not feed material from the channel section 22 towards the conveying pipe 100 when the shaper of the material is used as an impediment.

Typically the material is waste material, such as waste material arranged in bags. An input point and an intermediate container can be adapted to be a part of a pneumatic waste conveying system or it can be a separate part, in which waste material is conducted into a waste room, waste container or corresponding.

The embodiment of FIGS. 1-8 presents a feed-in station comprising input points for four material categories w1, w2, w3, w4. Of the categories, the first material category w1 (in the figure, mixed waste) is in one case in the region of approx. 50% by weight of the total waste amount. The second material category w2 (in the figure, paper) approx. 25%, the third material category w3 (biodegradable waste) approx. 10% and the fourth material category w4 (paperboard) 15% and biodegradable waste 10% by weight of the total waste amount. The different material categories require intermediate containers of different sizes. The material categories compress in size in different ways. The first material category w1 by about approx. 50%, the second material category w2 (paper) by approx. 30%, the fourth material category (paperboard) by approx. 50%, and the third material category (biodegradable waste) by very little (almost 0%), in which case it is not worth compressing, i.e. compacting, it.

The size of the intermediate container is determined by the amount, density and compressibility of the waste. Mixed waste (in some countries recycleable waste, plastic bottles, et cetera) is generally the largest material category by volume. But it has the property also that mixed waste can be compressed, i.e. compacted, by approx. 50-70%. This material category, depending on the embodiment, typically requires of an intermediate container the same amount, or even more, volume than all the other material categories together. With the arrangement according to the invention, different volume requirements for different categories of material are efficiently achieved as a solution. By means of the invention it is possible to manage with only one input point for even the mixed waste requiring most capacity, whereas in conventional use 2-3 times the number of input points would be needed.

According to an embodiment of the invention comprising two consecutive impeding means in the channel section that is in a direction deviating from the vertical direction, a large capacity but a shallow structure is achieved. According to one embodiment a capacity of e.g. altogether 600 L of mixed waste (e.g. 200 liters in the vertical part and 2×200 L in the horizontal part) is achieved.

The method according to the invention can also be utilized in a waste conveying system in such a way that a dedicated cycle is arranged for precompression/conveying. In this case the wastes of each input point, which are conducted into a channel part functioning as an intermediate container, are precompressed in turn, e.g. for 10 s. In this case the waste volume of the intermediate containers increases by e.g. 30-50%.

The compression phase can be arranged in such a way that precompression of the input point in question or of the input points of a waste fraction is performed during the conveying of some other input point or waste fraction.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. An apparatus for handling waste material comprising:
a feed-in container having an input aperture;
a channel section extending from the feed-in container;
a material conveying pipe extending from the channel section, wherein the waste material introduced into the feed-in container through the input aperture travels through the channel section and the material conveying pipe;
an impediment having a first position allowing the waste material to pass through the channel section and a second position extending across the channel section, said impediment stopping the waste material and allowing an air flow through the channel section when in the second position; and
a source of suction or transport air,
wherein force applied by the transport air or suction against the waste material prevented from moving by the impediment in the second position compresses the waste material.

2. The apparatus according to claim 1, further comprising:
a first feed-in container having a first input aperture and a first channel section extending from the first feed-in container;
a second feed-in container having a second input aperture and a second channel section extending from the second feed-in container,
wherein the impediment is arranged in the second channel section between the second input point and the first channel section of the first input point.

3. The apparatus according to claim 1, further comprising:
a first feed-in container having a first input aperture and a first channel section extending from the first feed-in container;
a second feed-in container having a second input aperture and a second channel section extending from the second feed-in container,
wherein a length of the first channel section in the material conveying direction is greater than a length in the material conveying direction of the second channel section.

4. The apparatus according to claim 1, wherein the apparatus comprises means for opening and closing a connection to s suction side of a vacuum generator from the channel section and/or replacement air means, for conducting replacement air in a regulated manner into the channel section between an input point and the material, which means are adapted to open and close a pathway for replacement air.

5. The apparatus according to claim 1, wherein the channel section is arranged between an input aperture and the material conveying pipe, wherein the channel section deviates from a vertical direction.

6. The apparatus according to claim 1, further comprising a plurality of impediments that are a distance from each other in the material conveying direction between the input aperture and the material conveying pipe.

7. The apparatus according to claim 1, further comprising means for bringing replacement air into a vicinity of the impediment.

8. The apparatus according to claim 1, further comprising a replacement air valve to allow entry of replacement air into the channel section.

9. The apparatus according to claim 1, further comprising a discharge valve between the input aperture and the channel section.

10. The apparatus according to claim 1, further comprising a discharge valve between the impediment and the material conveying pipe.

11. The apparatus according to claim 1, further comprising a shut-off means between the feed-in container and the input aperture.

12. The apparatus according to claim 1, further comprising a replacement air valve for opening and closing a pathway of the replacement air into the feed-in container or the channel section.

13. The apparatus according to claim 12, wherein a flow aperture of the pathway for replacement air is smaller than a cross-sectional area of the channel section.

14. The apparatus according to claim 1, wherein the channel section is installed to a depth that is approx. 1-2.5 meters from a ground surface.

15. The apparatus according to claim 1, wherein the impediment is a separate impediment, which can be moved between the first position, in which the impediment extends into the channel section and the second position, in which the impediment does not extend into the channel section, and through or past which impediment the replacement air flow in the channel space is adapted to travel.

16. The apparatus according to claim 1, wherein the impediment is a material handling device, such as shaper of the material, the handling means of which are adapted to be in an operating state wherein they do not feed material from the channel section towards the material conveying pipe when the shaper of the material is used as an impediment.

17. A waste conveying system, which comprises an apparatus according to claim 1.

18. The apparatus according to claim 1, wherein the channel section of at least one second input point is connected to the channel section of one first input point between the input point and the impediment.

* * * * *